US012348982B2

(12) United States Patent
Chande et al.

(10) Patent No.: US 12,348,982 B2
(45) Date of Patent: Jul. 1, 2025

(54) TECHNIQUES FOR INDICATING A PREFERRED BEAM IN WIRELESS COMMUNICATION RANDOM ACCESS

(71) Applicant: QUALCOMM Incorporated, San Diego, CA (US)

(72) Inventors: Vinay Chande, San Diego, CA (US); Xiaoxia Zhang, San Diego, CA (US); Tao Luo, San Diego, CA (US); Arumugam Chendamarai Kannan, San Diego, CA (US); Makesh Pravin John Wilson, San Diego, CA (US); Wooseok Nam, San Diego, CA (US); Sungwoo Park, San Diego, CA (US); Jing Sun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 139 days.

(21) Appl. No.: 16/750,828

(22) Filed: Jan. 23, 2020

(65) Prior Publication Data
US 2020/0245157 A1 Jul. 30, 2020

Related U.S. Application Data

(60) Provisional application No. 62/805,211, filed on Feb. 13, 2019, provisional application No. 62/796,551, filed on Jan. 24, 2019.

(51) Int. Cl.
*H04W 16/28* (2009.01)
*H04W 56/00* (2009.01)
*H04W 74/0833* (2024.01)

(52) U.S. Cl.
CPC ......... *H04W 16/28* (2013.01); *H04W 56/001* (2013.01); *H04W 74/0833* (2013.01)

(58) Field of Classification Search
CPC ............... H04W 16/28; H04W 56/001; H04W 74/0833; H04W 74/08; H04B 7/0695
See application file for complete search history.

(56) References Cited

U.S. PATENT DOCUMENTS

| 2018/0220360 A1 | 8/2018 | Sheng et al. |
| 2018/0279380 A1* | 9/2018 | Jung ................. H04W 56/0005 |

(Continued)

FOREIGN PATENT DOCUMENTS

| EP | 3419340 A1 | 12/2018 |
| WO | 2019018542 A1 | 1/2019 |

OTHER PUBLICATIONS

FUJITSU: "Discussion on PRACH Configuration in NR," 3GPP Draft, 3GPP TSG RAN WG1 Meeting #87, R1-1611461, Discussion on PRACH Configuration in NR Final, 3rd Generation Partnership Project (3GPP), Mobile Competence Centre, 650, Route Des Lucioles, F-06921, Sophia-Antipolis Cedex, France, vol. Ran WG1, No. Reno, USA; Nov. 14, 2016-Nov. 18, 2016, Nov. 4, 2016 (Nov. 4, 2016), XP051189074, 5 pages, Retrieved from the Internet: URL:http://www.3gpp.org/ftp/tsg_ran/WG1_RL1/TSGR1_87/Docs/ [retrieved on Nov. 4, 2016], section 2.3; figure 6.

(Continued)

*Primary Examiner* — Chuong M Nguyen
(74) *Attorney, Agent, or Firm* — ArentFox Schiff LLP

(57) ABSTRACT

Aspects described herein relate to receiving multiple synchronization signal block (SSB) signals from a base station, wherein the multiple SSB signals are each beamformed based on a different directional beam, selecting a signature from a signature space of a first SSB of the multiple SSB signals, and transmitting, based on the signature, a random access message to the base station, wherein the random access message includes an indicator of a preferred SSB of the multiple SSB signals.

33 Claims, 9 Drawing Sheets

(56) References Cited

U.S. PATENT DOCUMENTS

| | | | |
|---|---|---|---|
| 2018/0359716 A1* | 12/2018 | Bai | H04W 52/0216 |
| 2018/0368189 A1* | 12/2018 | Narasimha | H04L 5/0053 |
| 2018/0376428 A1 | 12/2018 | Lin et al. | |
| 2019/0052334 A1* | 2/2019 | Jeon | H04J 11/0076 |
| 2019/0053271 A1* | 2/2019 | Islam | H04W 74/0833 |
| 2019/0074880 A1* | 3/2019 | Frenne | H04B 7/0617 |
| 2019/0090282 A1* | 3/2019 | Shi | H04W 76/11 |
| 2019/0159136 A1* | 5/2019 | MolavianJazi | H04W 52/362 |
| 2020/0008247 A1* | 1/2020 | Kwak | H04B 7/0695 |
| 2020/0214014 A1* | 7/2020 | Wang | H04L 5/0048 |
| 2020/0220605 A1* | 7/2020 | Xu | H04B 7/0626 |
| 2020/0275479 A1* | 8/2020 | Peisa | H04W 74/04 |
| 2020/0288503 A1* | 9/2020 | Sahlin | H04W 16/28 |
| 2020/0296765 A1* | 9/2020 | Kim | H04W 72/0446 |

OTHER PUBLICATIONS

FUJITSU: "Discussion on RAR in NR Considering Reciprocity Issues", 3GPP Draft, 3GPP TSG RAN WG1 Meeting #87, R1-1611462 Discussion on RAR in NR Considering Reciprocity Issues Final, 3rd Generation Partnership Project (3GPP), Mobile Competence Centre; 650, Route Des Lucioles; F-06921 Sophia-Antipolis Cedex; France, vol. Ran WG1, No. Reno, USA; Nov. 14, 2016-Nov. 18, 2016, Nov. 13, 2016, XP051175441, Retrieved from the Internet: URL: http://www.3gpp.org/ftp/Meetings_3GPP_SYNC/RAN1/Docs/ [retrieved on Nov. 13, 2016], section 2.2 section 2.3, 6 pages.
International Search Report and Written Opinion—PCT/US2020/015060—ISA/EPO—May 8, 2020.

* cited by examiner

TECHNIQUES FOR INDICATING A PREFERRED BEAM IN WIRELESS COMMUNICATION RANDOM ACCESS

CLAIM OF PRIORITY UNDER 35 U.S.C. § 119

The present Application for Patent claims priority to Provisional Application No. 62/796,551, entitled "TECHNIQUES FOR INDICATING A PREFERRED BEAM IN WIRELESS COMMUNICATION RANDOM ACCESS" filed Jan. 24, 2019, and Provisional Application No. 62/805,211, entitled "TECHNIQUES FOR COMMUNICATING RESOURCE GROUPINGS USED FOR A RANDOM ACCESS PROCEDURE" filed Feb. 13, 2019, which are assigned to the assignee hereof and hereby expressly incorporated by reference herein for all purposes.

BACKGROUND

Aspects of the present disclosure relate generally to wireless communication systems, and more particularly, to performing random access.

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some wireless communication technologies, a random access procedure is used by a device to request, from a base station, access to a wireless network. In NR, the base station can transmit synchronization signal beams (SSBs) that are beamformed as a directional beam, and a device can perform the random access procedure based on a SSB that is received and determined to have desirable signal properties.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an example, a method of wireless communication is provided. The method includes receiving multiple synchronization signal block (SSB) signals from a base station, wherein the multiple SSB signals are each beamformed based on a different directional beam, selecting a signature from a signature space of a first SSB of the multiple SSB signals, and transmitting, based on the signature, a random access message to the base station, wherein the random access message includes an indicator of a preferred SSB of the multiple SSB signals.

In another example, a method for wireless communications is provided. The method includes transmitting multiple SSB signals, wherein the multiple SSB signals are each beamformed based on a different directional beam, receiving, from a device and based on a signature of a first SSB of the multiple SSB signals, a random access message, wherein the random access message includes an indicator of a preferred SSB of the multiple SSB signals, and determining, based on the random access message, the first SSB and the preferred SSB.

In another example, an apparatus for wireless communication is provided that includes a transceiver, a memory configured to store instructions, and one or more processors communicatively coupled with the transceiver and the memory. The one or more processors are configured to receive multiple SSB signals from a base station, wherein the multiple SSB signals are each beamformed based on a different directional beam, select a signature from a signature space of a first SSB of the multiple SSB signals, and transmit, based on the signature, a random access message to the base station, wherein the random access message includes an indicator of a preferred SSB of the multiple SSB signals.

In another example, an apparatus for wireless communication is provided that includes a transceiver, a memory configured to store instructions, and one or more processors communicatively coupled with the transceiver and the memory. The one or more processors are configured to transmit multiple SSB signals, wherein the multiple SSB signals are each beamformed based on a different directional beam, receive, from a device and based on a signature of a first SSB of the multiple SSB signals, a random access message, wherein the random access message includes an indicator of a preferred SSB of the multiple SSB signals, and determine, based on the random access message, the first SSB and the preferred SSB.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
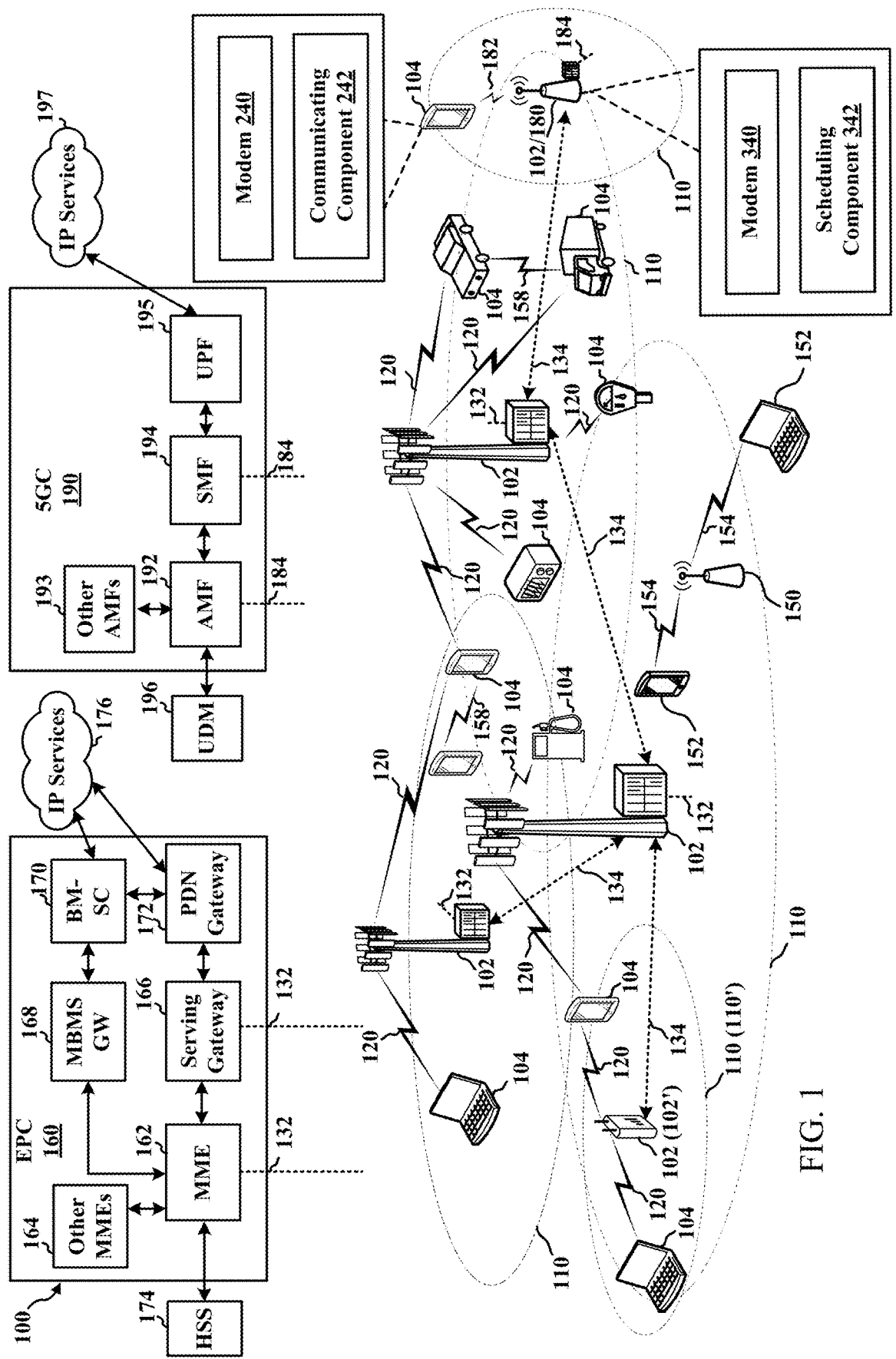
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to performing random access based on a first received beam and indicating another desired beam. In this regard, a base station or other node receiving a random access request can switch the requesting device to the desired beam at some point during the random access procedure or afterwards. In some situations, described further herein, the device may observe the desired beam but may not be able to perform the random access procedure based on the preferred beam. In an example, the device may be able to perform the random access procedure based on another acceptable beam (or at least may be able to do so sooner than using the preferred beam). Aspects described herein allow the device to indicate the desired beam in performing random access based on the acceptable beam.

For example, fifth generation (5G) new radio (NR) networks can use Random Access Procedure (RACH) as part of one or more of initial access, handover, system information (SI) request, beam failure recovery, etc. The first transmission in a 4-step RACH Procedure is referred to as Msg 1. Msg 1 can be identified by a signature, where the signature may include the tuple of physical RACH (PRACH) preamble, and RACH occasion parameters, such as time and/or frequency resource, one or more of which may be configured, to a user equipment (UE), by a network or otherwise known or received by the UE. The UE performing the RACH with the network (e.g., with a base station) can select a signature from a configured collection of PRACH preambles and time and/or frequency resources (or other parameters) defining the RACH occasion. In one example, for initial access the configuration can be specified in remaining minimum system information (RMSI) broadcast by the base station, as a mapping between synchronization signal block (SSB)/physical broadcast channel (PBCH) index and one or more Msg 1 signatures. In another example, for contention free random access in connected mode UE, the signature and reference signal (RS) pair can be configured to the UE by a physical downlink control channel (PDCCH) order from the base station, where the RS could be a SSB or channel state information reference signal (CSI-RS). In an example, reception of Msg1 at a base station (e.g., gNB) can include detecting physical RACH (PRACH) transmitted by a UE and identifying the RACH occasion and preamble index used by the UE to transmit the PRACH. For example, the base station can use the identified RACH occasion to construct random access radio network temporary identifier (RA-RNTI) and/or can use the identified preamble index to construct random access preamble identifier (RAPID) for the UE.

In third generation partnership project (3GPP) Release 15 NR, for example, under all possible PRACH configurations there is a one-to-many relationship between SSB/PBCH indices and Msg 1 signatures, such that for any SSB index, more than one Msg 1 Signature (e.g., tuple of PRACH preamble, RACH occasion) can be configured. On the other hand, in the specific example of 3GPP Release 15 NR, a given Msg 1 signature (e.g., tuple of PRACH preamble, RACH occasion) can be mapped to only one SSB index. It may be possible, in this specific example, that any one component of the signature (e.g. PRACH preamble, or Time Resource for RACH, or Frequency Resource for RACH) can be mapped to more than one SSB.

In 3GPP Release 15, after sending Msg 1, as part of the 4-step RACH Procedure, the UE can receive a second message (Msg 2) from the base station over the PDCCH or physical downlink shared channel (PDSCH) resources. In this specific example, the RACH Procedure can include the following: when processing PDCCH and PDSCH corresponding to Msg 2, UE can assume that the Quasi-Co-Location (QCL) relationships with the corresponding SSB, on which Msg 1 is based, hold for Msg 2. Subsequent Contention Resolution PDSCH may also assumed to be QCL with respect to the same SSB. In this example, QCL relationships may take additional importance under higher bands communication such as in frequency range 2 (FR2) millimeter wave (mmWave) defined in NR where SSBs may be transmitted on highly directional beams. Even for Msg 1 reception, for a given SSB RACH Occasion, the gNB may, in one example, deploy directional receive (Rx) beams with correspondence to the SSB beams.

In unlicensed operation, which can be subject to listen-before-talk (LBT) or other clear channel assessment (CCA) procedures, the UE may not be able to access a shared radio frequency spectrum medium at a certain point in time (e.g., may lose the medium at a certain point in time) after transmitting and/or receiving to allow other UEs to access the medium. Due to this uncertainty of accessing the shared radio frequency spectrum medium or possible loss in medium due to LBT, a RACH occasion corresponding to a SSB/beam (e.g., a SSB/beam with the strongest signal strength) may be unavailable. In addition, in an example, a PRACH occasion for a SSB/beam having an acceptable signal strength, but lower than the beam with the strongest signal strength) beam may be available sooner. In such cases, the UE may wait for the SSB/beam (e.g., SSB/beam with the strongest signal strength) in the next period, which may result in a higher latency incurred in order to perform random access procedure via the stronger beam. Also in such cases, the UE may use an SSB/beam (e.g., an SSB/beam having an acceptable signal strength but lower than the signal strength of another SSB/beam) in the same period which a lower latency can be incurred however, a weaker signal strength is used to perform the random access procedure. For highly directional beamforming e.g. mmWave, this potential issue may not be adequately addressed by mapping multiple SSBs to same RACH occasion, as in that case a receive beam at gNB has to be wide enough to adequately receive power controlled PRACH transmissions simultaneously along multiple beams. Without loss of generality, aspects described herein relate to considering, determining, and/or specifying SSBs mapped to disjoint RACH occasions.

For example, as described herein, a UE may be enabled to receive multiple SSB signals from a gNB, and determine both a first SSB deemed to be acceptable for (e.g., having an acceptable signal strength for) performing a RACH procedure and a more desirable SSB (e.g., having a higher signal strength than the first SSB) also referred to herein as a "preferred SSB") for continuing the RACH procedure and/or subsequent communications. In an example, the UE can accordingly select a signature from a signature space for the first SSB deemed to be acceptable for performing the RACH procedure, and can indicate (e.g., in a random access message, such as Msg 1) the preferred SSB for continuing the RACH procedure. The gNB can receive the random access message from the UE, and can determine the first SSB and the preferred SSB based on the signature. The gNB can accordingly continue the RACH procedure based on the preferred SSB in one or more messages in the RACH (e.g., message 2 or 4 in a 4-step RACH, or Msg B in a two-step RACH). In this regard, the UE can initiate the RACH procedure based on one SSB that may be available, for example, to allow for the UE to initiate a RACH procedure earlier (e.g., using a sooner RACH occasion instead of waiting for the next period), but may indicate the preferred SSB to enable the gNB to configure RACH procedure and/or subsequent communications for the UE based on the preferred SSB. This can benefit UEs in unlicensed or other contention-based operations, as described, and/or can allow for faster RACH operation by allowing the UE to select the first acceptable SSB for initiating the RACH procedure.

The described features will be presented in more detail below with reference to FIGS. 1-9.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, SC-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and a wireless communication access network 100, in accordance with various aspects of the present disclosure. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 240 and communicating component 242 for communicating with one or more nodes in the network (e.g., base stations), which may include initiating a RACH procedure based on received SSB signals. In addition, some nodes may have a modem 340 and scheduling component 342 for scheduling or otherwise enabling network-based communications for one or more nodes in the networks (e.g., UEs), which may include transmitting SSB signals and facilitating device connection via RACH procedure, as described herein. Though a UE 104 is shown as having the modem 240 and communicating component 242 and a base station 102/gNB 180 is shown as having the modem 340 and scheduling component 342, this is one illustrative example, and substantially any node or type of node may include a modem 240 and communicating component 242 and/or a modem 340 and scheduling component 342 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMES 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

In an example, scheduling component 342 can transmit a plurality of beamformed SSB signals, which one or more UEs can receive and determine which SSB signal to indicate in requesting access via a random access (e.g., RACH) procedure with the base station 102. Communicating component 242 can accordingly receive multiple SSB signals from the base station 102 (and/or gNB 180, though the term base station 102 is generally used to describe aspects herein) and can determine both of a first SSB to use in requesting access via the RACH procedure and a preferred SSB to indicate during requesting of the access via the RACH procedure. Scheduling component 342 can accordingly receive the request for access from the UE 104 based on the first SSB and can perform at least part of the RACH procedure and/or subsequent communications based on the preferred SSB, as described further herein.

Figure 2:
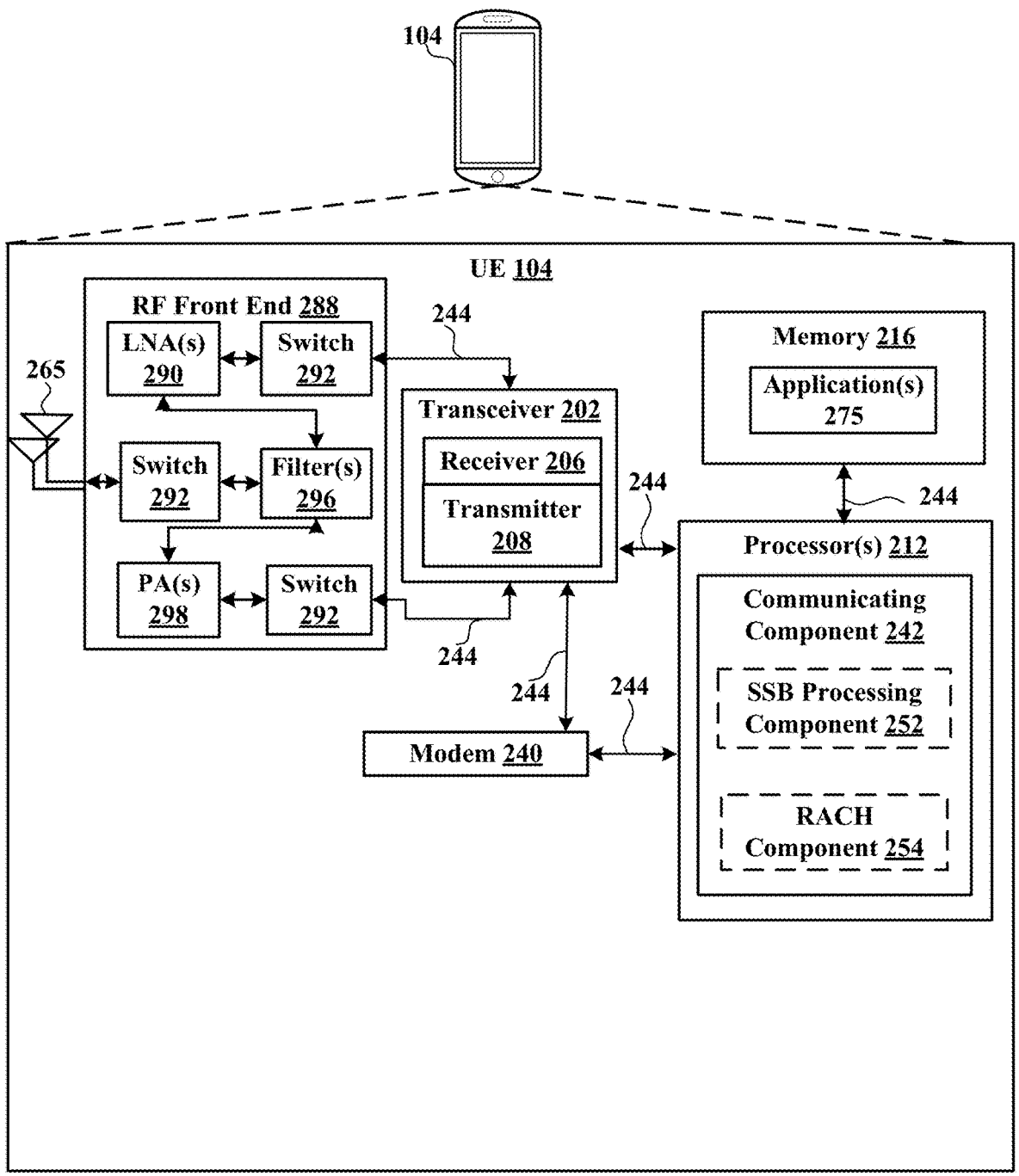
FIG. 2 is a block diagram illustrating an example of a UE, in accordance with various aspects of the present disclosure.
Figure 3:
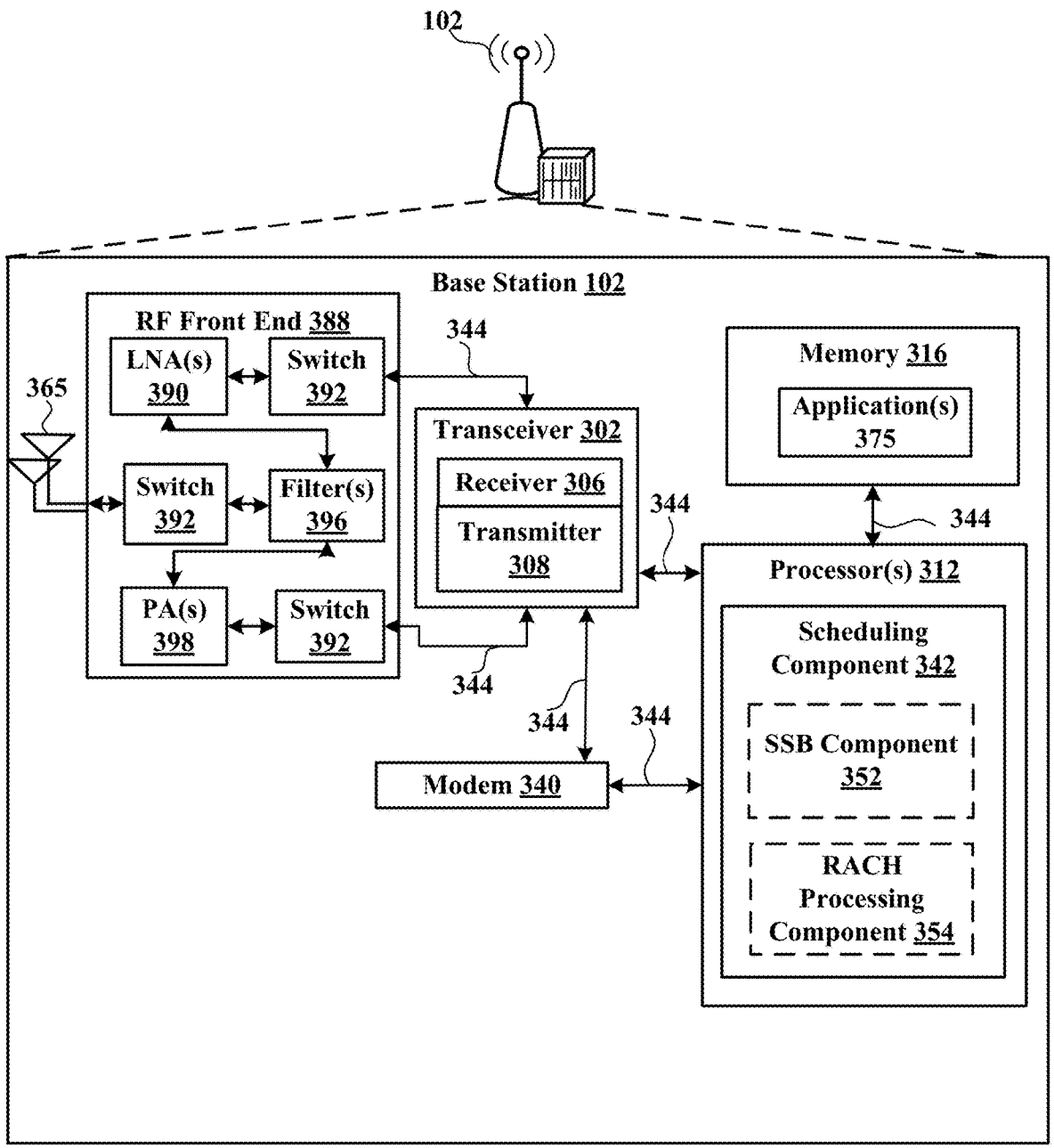
FIG. 3 is a block diagram illustrating an example of a base station, in accordance with various aspects of the present disclosure.
Figure 4:
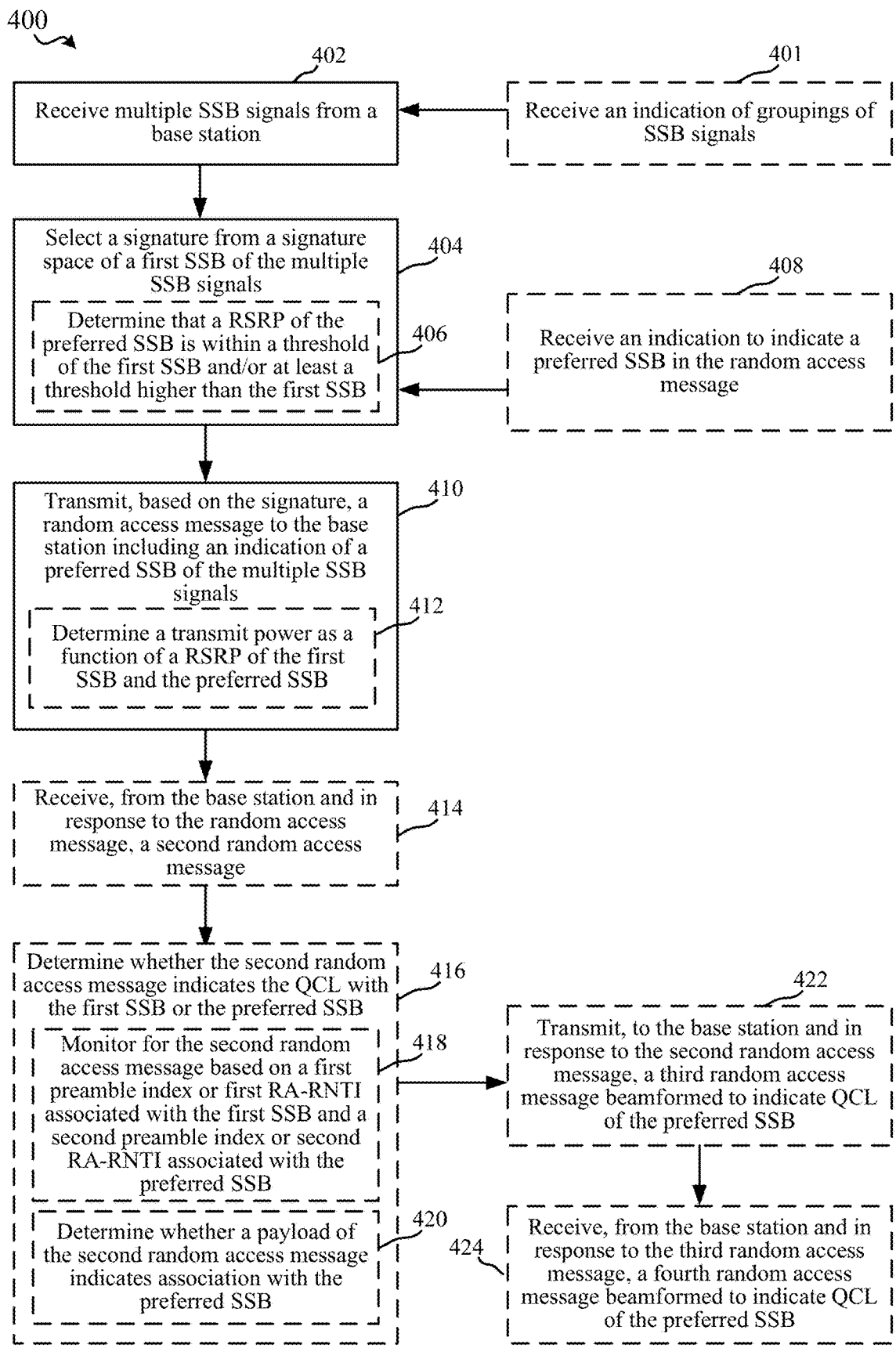
FIG. 4 is a flow chart illustrating an example of a method for initiating a random access procedure, in accordance with various aspects of the present disclosure.
Figure 5:
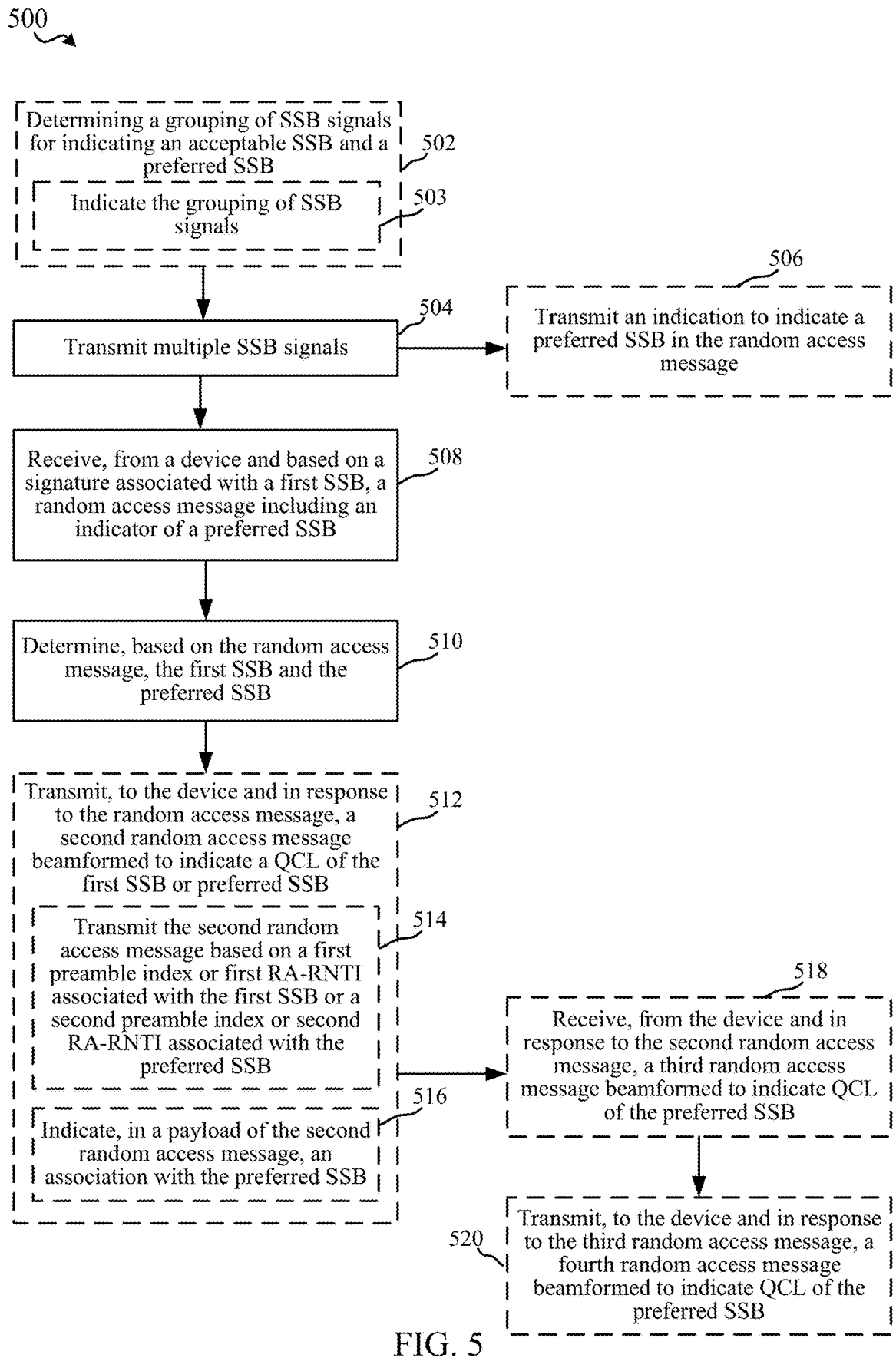
FIG. 5 is a flow chart illustrating an example of a method for transmitting multiple beamformed synchronization signal blocks (SSBs), in accordance with various aspects of the present disclosure.

Turning now to FIGS. 2-9, aspects are depicted with reference to one or more components and one or more methods that may perform the actions or operations described herein, where aspects in dashed line may be optional. Although the operations described below in FIGS. 4-5 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Referring to FIG. 2, one example of an implementation of UE 104 may include a variety of components, some of which have already been described above and are described further herein, including components such as one or more processors 212 and memory 216 and transceiver 202 in communication via one or more buses 244, which may operate in conjunction with modem 240 and/or communicating component 242 to receive and indicate multiple SSB signals in a RACH procedure.

In an aspect, the one or more processors 212 can include a modem 240 and/or can be part of the modem 240 that uses one or more modem processors. Thus, the various functions related to communicating component 242 may be included in modem 240 and/or processors 212 and, in an aspect, can be executed by a single processor, while in other aspects, different ones of the functions may be executed by a combination of two or more different processors. For example, in an aspect, the one or more processors 212 may include any one or any combination of a modem processor, or a baseband processor, or a digital signal processor, or a transmit processor, or a receiver processor, or a transceiver processor associated with transceiver 202. In other aspects, some of the features of the one or more processors 212 and/or modem 240 associated with communicating component 242 may be performed by transceiver 202.

Also, memory 216 may be configured to store data used herein and/or local versions of applications 275 or communicating component 242 and/or one or more of its subcomponents being executed by at least one processor 212. Memory 216 can include any type of computer-readable medium usable by a computer or at least one processor 212, such as random access memory (RAM), read only memory (ROM), tapes, magnetic discs, optical discs, volatile memory, non-volatile memory, and any combination thereof. In an aspect, for example, memory 216 may be a non-transitory computer-readable storage medium that stores one or more computer-executable codes defining communicating component 242 and/or one or more of its subcomponents, and/or data associated therewith, when UE 104 is operating at least one processor 212 to execute communicating component 242 and/or one or more of its subcomponents.

Transceiver 202 may include at least one receiver 206 and at least one transmitter 208. Receiver 206 may include hardware, firmware, and/or software code executable by a processor for receiving data, the code comprising instructions and being stored in a memory (e.g., computer-readable medium). Receiver 206 may be, for example, a radio frequency (RF) receiver. In an aspect, receiver 206 may receive signals transmitted by at least one base station 102. Additionally, receiver 206 may process such received signals, and also may obtain measurements of the signals, such as, but not limited to, Ec/Io, signal-to-noise ratio (SNR), reference signal received power (RSRP), received signal strength indicator (RSSI), etc. Transmitter 208 may include hardware, firmware, and/or software code executable by a processor for transmitting data, the code comprising instructions and being stored in a memory (e.g., computer-readable medium). A suitable example of transmitter 208 may including, but is not limited to, an RF transmitter.

Moreover, in an aspect, UE 104 may include RF front end 288, which may operate in communication with one or more antennas 265 and transceiver 202 for receiving and transmitting radio transmissions, for example, wireless communications transmitted by at least one base station 102 or wireless transmissions transmitted by UE 104. RF front end 288 may be connected to one or more antennas 265 and can include one or more low-noise amplifiers (LNAs) 290, one or more switches 292, one or more power amplifiers (PAs) 298, and one or more filters 296 for transmitting and receiving RF signals.

In an aspect, LNA 290 can amplify a received signal at a desired output level. In an aspect, each LNA 290 may have a specified minimum and maximum gain values. In an aspect, RF front end 288 may use one or more switches 292 to select a particular LNA 290 and its specified gain value based on a desired gain value for a particular application.

Further, for example, one or more PA(s) 298 may be used by RF front end 288 to amplify a signal for an RF output at a desired output power level. In an aspect, each PA 298 may have specified minimum and maximum gain values. In an aspect, RF front end 288 may use one or more switches 292 to select a particular PA 298 and its specified gain value based on a desired gain value for a particular application.

Also, for example, one or more filters 296 can be used by RF front end 288 to filter a received signal to obtain an input RF signal. Similarly, in an aspect, for example, a respective filter 296 can be used to filter an output from a respective PA 298 to produce an output signal for transmission. In an aspect, each filter 296 can be connected to a specific LNA 290 and/or PA 298. In an aspect, RF front end 288 can use one or more switches 292 to select a transmit or receive path using a specified filter 296, LNA 290, and/or PA 298, based on a configuration as specified by transceiver 202 and/or processor 212.

As such, transceiver 202 may be configured to transmit and receive wireless signals through one or more antennas 265 via RF front end 288. In an aspect, transceiver may be tuned to operate at specified frequencies such that UE 104 can communicate with, for example, one or more base stations 102 or one or more cells associated with one or more base stations 102. In an aspect, for example, modem 240 can configure transceiver 202 to operate at a specified frequency and power level based on the UE configuration of the UE 104 and the communication protocol used by modem 240.

In an aspect, modem 240 can be a multiband-multimode modem, which can process digital data and communicate with transceiver 202 such that the digital data is sent and received using transceiver 202. In an aspect, modem 240 can be multiband and be configured to support multiple frequency bands for a specific communications protocol. In an aspect, modem 240 can be multimode and be configured to support multiple operating networks and communications protocols. In an aspect, modem 240 can control one or more components of UE 104 (e.g., RF front end 288, transceiver 202) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, communicating component 242 can optionally include a SSB processing component 252 for receiving and processing multiple SSBs from a base station, and/or a RACH component 254 for initiating a RACH procedure with the base station, which may include indicating multiple SSBs (e.g., an acceptable SSB for initiating the RACH procedure and a desired SSB that may have more desirable properties than the acceptable SSB).

In an aspect, the processor(s) 212 may correspond to one or more of the processors described in connection with the UE in FIG. 9. Similarly, the memory 216 may correspond to the memory described in connection with the UE in FIG. 9.

Referring to FIG. 3, one example of an implementation of base station 102 (e.g., a base station 102 and/or gNB 180, as described above) may include a variety of components, some of which have already been described above, but including components such as one or more processors 312 and memory 316 and transceiver 302 in communication via one or more buses 344, which may operate in conjunction with modem 340 and scheduling component 342 for scheduling or otherwise enabling UE communications with the base station 102 and/or other nodes of a wireless network.

The transceiver 302, receiver 306, transmitter 308, one or more processors 312, memory 316, applications 375, buses 344, RF front end 388, LNAs 390, switches 392, filters 396, PAs 398, and one or more antennas 365 may be the same as or similar to the corresponding components of UE 104, as described above, but configured or otherwise programmed for base station operations as opposed to UE operations.

In an aspect, scheduling component 342 can optionally include a SSB component 352 for generating and transmitting multiple SSB signals that can be beamformed in one or more directions for detecting by one or more UEs, and/or a RACH processing component 354 for processing RACH messages received from one or more UEs to facilitate wireless communication to the one or more UEs (e.g., to provide network access thereto).

In an aspect, the processor(s) 312 may correspond to one or more of the processors described in connection with the base station in FIG. 9. Similarly, the memory 316 may correspond to the memory described in connection with the base station in FIG. 9.

FIG. 4 illustrates a flow chart of an example of a method 400 for initiating a RACH procedure based on multiple SSBs, in accordance with various aspects of the present disclosure. In an example, a UE 104 can perform the functions described in method 400 using one or more of the components described in FIGS. 1 and 2. FIG. 5 illustrates a flow chart of an example of a method 500 for transmitting multiple SSBs to one or more UEs and performing a RACH procedure with the one or more UEs, in accordance with various aspects of the present disclosure. In an example, a base station 102 (and/or gNB 180, as described above) can perform the functions described in method 500 using one or more of the components described in FIGS. 1 and 3. FIGS. 4 and 5 are described in conjunction with one another herein, though the methods 400 and 500 can be performed independently by respective devices (e.g., UEs, base stations, etc.) without requiring the other.

In method 500, at Block 502, a grouping of SSB signals for indicating an acceptable SSB and a preferred SSB can be determined. In an aspect, SSB component 352, e.g., in conjunction with processor(s) 312, memory 316, transceiver 302, scheduling component 342, etc., can determine the grouping of SSB signals for indicating an acceptable SSB and a preferred SSB. For example, SSB component 352 can create SSB request groups based on knowledge of the nested structures of beams. For example, SSB component 352 can create, for a first beam (e.g., an acceptable beam), a request group that include signatures associated with one or more other beams (e.g., preferred beams) that a UE may select. In an example, SSB component 352 can statically or dynamically create the request groups, as described herein, such as based on one or more determinations regarding the beams and/or associations therebetween (e.g., a difference in RSRP). In addition, in an example, SSB component 352 can indicate the request groups to one or more UEs (e.g., in RMSI for Contention Based random access (RA), in dedicated radio resource control (RRC) Signaling for Contention free RA, or other configuration, etc.). Where the request groups are dynamically generated, SSB component 352 can periodically transmit indications of the request groups. An example of request groups is depicted in FIG. 6.

Figure 6:
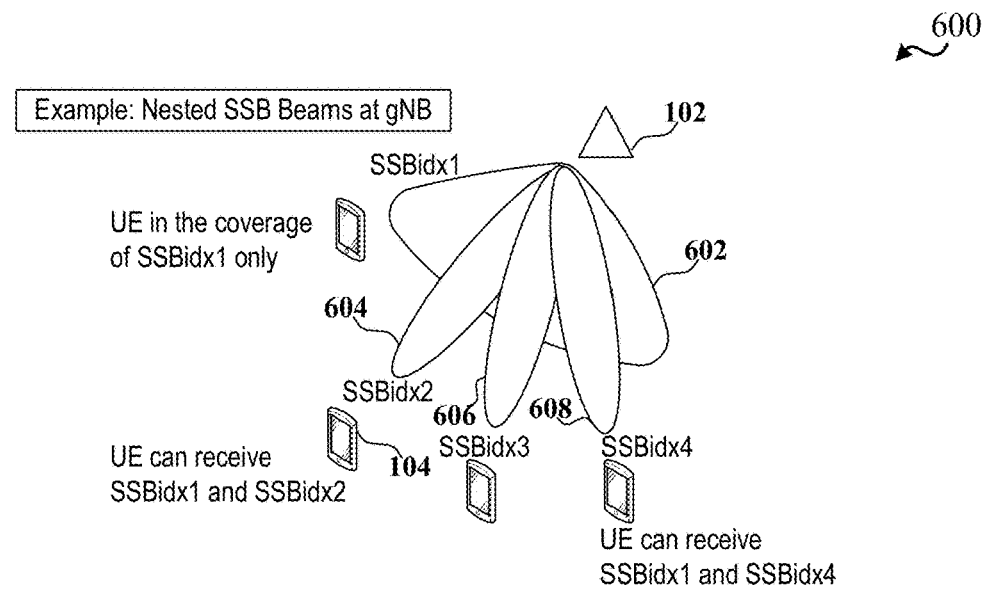
FIG. 6 illustrates SSB beams and signature space groupings, in accordance with various aspects of the present disclosure.
Figure 6:
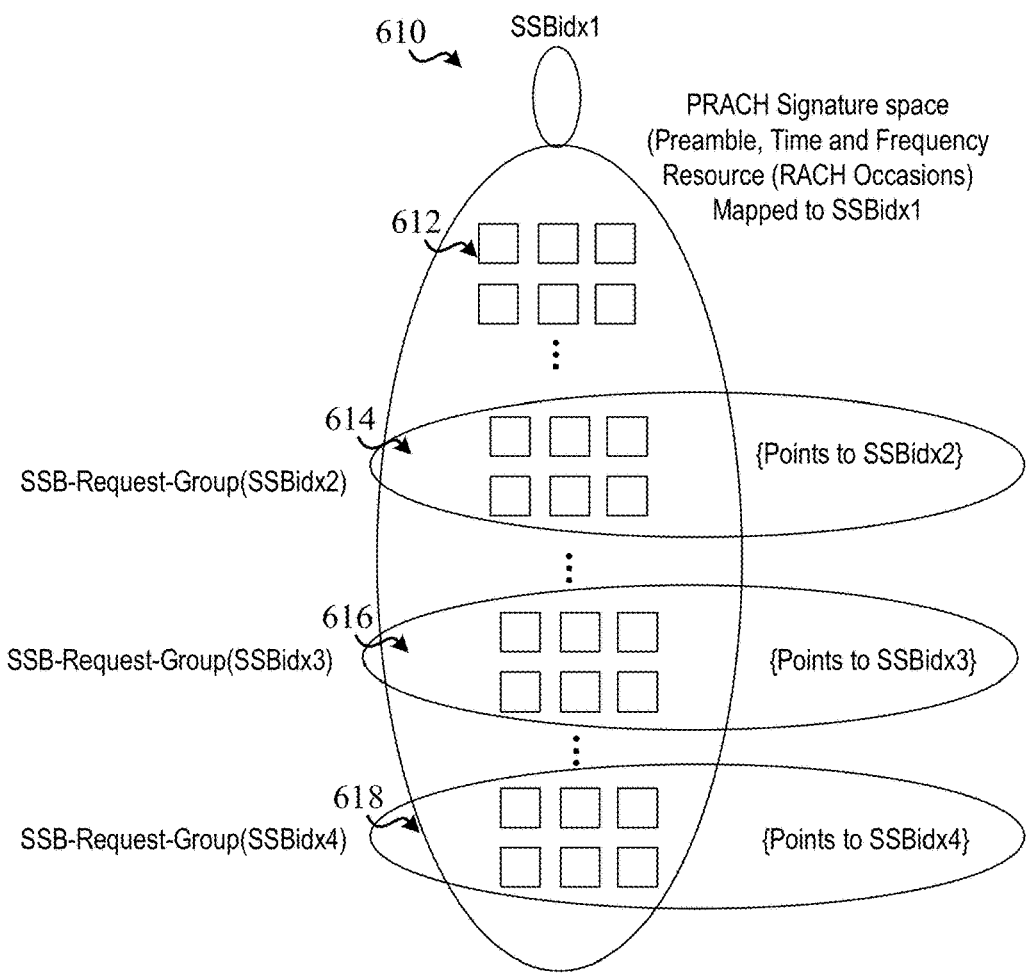

FIG. 6 illustrates an example of a beam configuration 600 by a base station 102. In this example, the base station 102 can transmit (or broadcast) multiple beams including SSBidx1 602, SSBidx2 604, SSBidx3 606, and SSBidx4 608. In this example, UE 104 can receive SSBidx1 602 and SSBidx2 604 transmitted by the base station 102. In another example, UE 104 may also receive SSBidx3 606 and/or SSBidx4 608, but these beams may not have desirable signal properties such to be considered for further communication procedures (e.g., SSBidx3 606 and/or SSBidx4 608 may have a RSRP that does not achieve an acceptable threshold). FIG. 6 also shows an example of a signature space 610 for SSBidx1 602. The signature space 610 can be split into groups 612, 614, 616, 618, where group 612 includes signatures for requesting random access based on SSBidx1 602 without indicating preference for a preferred SSB, group 614 includes signatures for requesting random access based on SSBidx1 602 with an indication of preference for preferred SSBidx2 (e.g., has having a strongest signal strength), group 616 includes signatures for requesting random access based on SSBidx1 602 with an indication of preference for preferred SSBidx3 (e.g., has having a strongest signal strength), and group 618 includes signatures for requesting random access based on SSBidx1 602 with an indication of preference for preferred SSBidx4 (e.g., has having a strongest signal strength). In one example, the grouping can be such that a given group of signatures can all have the same PRACH preamble sequence, and any two different groups can use different PRACH preamble sequences (e.g., the groups can be separated by looking at the preamble sequence component alone).

In an example, e.g., as described above in Block 502, SSB component 352 can statically or dynamically create SSB request groups based on certain information. For example, with reference to FIG. 6, SSB component 352 can create the SSB request groups based on knowledge of the nested structures of beams (e.g., SSBidx2 604 can have its SSB request group in SSBidx1 602 signatures based on these beams being nested). In addition, SSB component 352 can determine to include SSBidx2 604 request group in SSBidx1 602 signatures, as indicated by request group 614, if replacing SSBidx2 with SSBidx1 can reduce RSRP by at most by a number, X, of decibels (dB). In an example, larger values of X can increase the number of SSB request groups and hence increase the chance of PRACH collisions.

Figure 7:
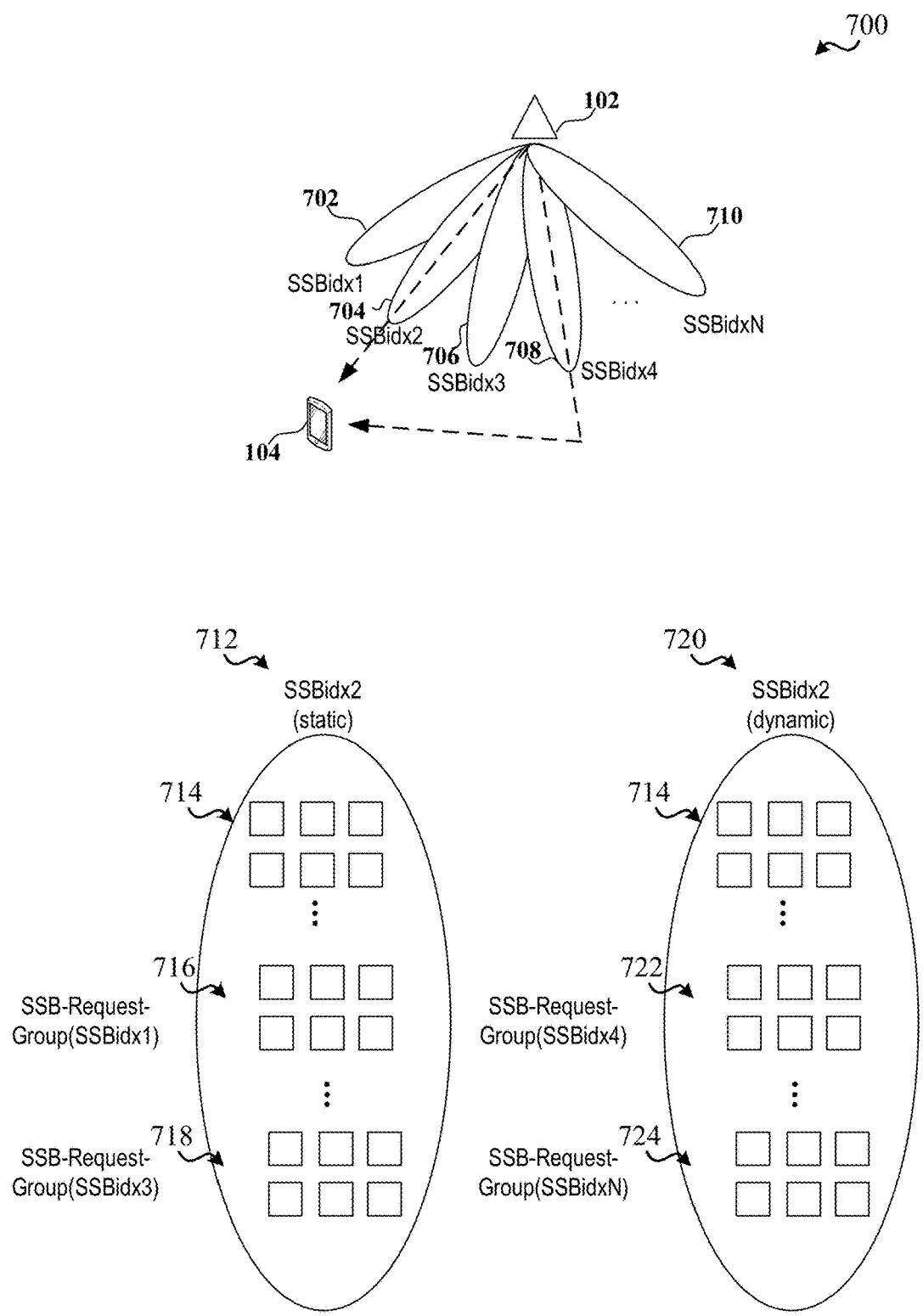
FIG. 7 illustrates SSB beams and static and dynamic signature space groupings, in accordance with various aspects of the present disclosure.

FIG. 7 illustrates another example of a beam configuration 700 by a base station 102. In this example, the base station 102 can transmit (or broadcast) multiple beams including SSBidx1 702, SSBidx2 704, SSBidx3 706, SSBidx4 708, . . . SSBidxN 710. In this example, UE 104 can receive at least SSBidx2 704 transmitted by the base station 102, and/or may be able to receive adjacent beams in a single transmission path scenario. In another example, however, UE 104 may receive SSBidx4 708 (e.g., along with SSBidx2 704) in a multiple transmission path, where SSBidx4 708 may reflect from a mobile or stationary object. Thus, in multiple path scenarios, desirable beams may not always be adjacent in direction and the environment may change over time resulting in different beams being desirable at the UE 104. FIG. 7 also shows examples of possible signature spaces 712, 720 for SSBidx2 704. In particular, SSB component 352 can configure a static request group in signature space 712 for SSBidx2 704 that includes groups of signatures for adjacent beams SSBidx1 702 (e.g., group 716) and SSBidx3 706 (e.g., group 718). SSB component 352 can additionally or alternatively configure a dynamic request group in signature space 720 for SSBidx2 704 that includes groups of signatures for beams having at least a threshold RSRP, which may not be adjacent beams, such as SSBidx4 708 (e.g., group 722) and SSBidxN 710 (e.g., group 724). As described, the desirable beams may change over time, and SSB component 352, in one example, can periodically update the signature space signaled to the UE to indicate the dynamic request group.

In a case of a single transmission path (e.g., where the UE 104 is in line-of-sight of a beam, such as SSBidx2 704), SSB component 352 can statically configure the groups 714, 716, 718. For example, the groups 714, 716, 718 may be statically configured with relevant SSB beams (e.g., a group of adjacent SSBs and/or nested SSBs, as described with respect to FIG. 6). For example, where the UE 104 is in line-of-sight of SSBidx2 704, it may be inferred that adjacent beams SSBidx1 702 and SSBidx3 706 (or nested beams as described with respect to FIG. 6) may be acceptable (e.g., with high probability or likelihood) as well or may likely be more acceptable than other beams.

In a case of a multiple transmission paths (e.g., where the beam has multiple paths, such as due to reflecting from an object), a second SSB/beam (e.g., an SSB/beam with the strongest signal strength) may not be adjacent to a first SSB/beam (e.g., an SSB/beam having an acceptable signal strength but lower than the second SSB/beam signal strength) used for the RACH procedure. SSB component 352 can dynamically configure the groups 722, 724 (in addition to group 714 that applies to SSBidx2 704) of the signature space 720 for the multiple transmission paths scenario. In various aspects, the signature spaces 712, 720 can be split into groups, where group 714 in each space includes signatures for requesting random access based on SSBidx2 704 itself without indicating a preference for a second SSB, group 716 in signature space 712 includes signatures for requesting random access based on SSBidx2 704 with an indication of a preference for SSBidx1 702 (e.g., a second SSB/beam with the strongest signal strength), group 718 in signature space 712 includes signatures for requesting random access based on SSBidx2 704 with an indication of a preference for SSBidx3 706 (e.g., a second SSB/beam with the strongest signal strength), group 722 of signature space 720 includes signatures for requesting random access based on SSBidx2 704 with an indication of a preference for SSBidx4 708 (e.g., a second SSB/beam with the strongest signal strength), and group 724 of signature space 720 includes signatures for requesting random access based on SSBidx2 704 with an indication of a preference for SSBidxN 710 (e.g., a second SSB/beam with the strongest signal strength).

Additionally or alternatively, the SSB component 352 may dynamically create SSB request groups for a signature space of an SSB. For example the SSB component 352 may dynamically create SSB request groups for a signature space of an SSB for the multiple transmission paths scenario, as described above. The dynamic configuration of the SSB request group may be indicated by RMSI broadcasted by the base station 102. In another example, the dynamic group information of the SSB request group may be indicated by an RRC message provided by the base station 102. In other examples, the dynamic group information of the SSB request group may be indicated by other system information (OSI) broadcasted by the base station 102. The SSB request group may be dynamically configured within an SSB-PRACH period (e.g., 160 ms). Additionally or alternatively, the SSB request group may be dynamically configured across an SSB-PRACH period.

Additionally or alternatively, the SSB component 352 may dynamically create SSB request groups for a signature space of an SSB in various manners. For example, the SSB component 352 may randomly create SSB request groups for a signature space of an SSB. In another example, the SSB component 352 may pseudo-randomly create SSB request groups for a signature space of an SSB. In other examples, the SSB component 352 may create SSB request groups for a signature space of an SSB in a round-robin manner. Moreover, for example, the SSB component 352 can create a grouping to include one or more static or dynamic groupings described above. In another example, SSB component 352 can select a mechanism for grouping (e.g., static, dynamic, random, pseudo-random, etc.) based on one or more considerations or measured parameters at the base station 102, such as deployment scenarios, channel conditions, SSB/PRACH parameter configurations, etc.

In determining the grouping at Block 502, optionally at Block 503, the grouping of SSB signals can be indicated. In an aspect, SSB component 352, e.g., in conjunction with processor(s) 312, memory 316, transceiver 302, scheduling component 342, etc., can indicate the grouping of SSB signals (e.g., to one or more devices, such as one or more UEs). For example, SSB component 352 can indicate the grouping of SSB signals in a system information broadcast, such as RMSI for Contention Based RA, as described, in dedicated RRC Signaling for Contention free RA, etc., such that devices can receive the indication and determine the grouping of SSB signals for indicating the acceptable (e.g., first) SSB and the preferred (e.g., second) SSB. In an example, SSB component 352 can periodically indicate the grouping of SSB signals (e.g., where the SSB component 352 dynamically determines the grouping of SSB signals, as described above). For example, SSB component 352 can periodically transmit the indication based on a time period or interval, based on an event, such as determining a change in the grouping of SSB signals, etc.

In method 500, at Block 504, multiple SSB signals can be transmitted. In an aspect, SSB component 352, e.g., in conjunction with processor(s) 312, memory 316, transceiver 302, scheduling component 342, etc., can generate and transmit the multiple SSB signals. For example, SSB component 352 can generate the multiple SSB signals using beamforming based on different directional beams to allow UEs 104 in different locations with respect to the base station 102 to receive and process one or more SSBs that are beamformed in a desirable direction for the UE 104. In an example, SSB component 352 can transmit the multiple SSB signals (also referred to herein as "beams") in different time instances. In an example, SSB component 352 can transmit the one or more SSBs based on information of the request groups, as described above and further herein.

In method 400, optionally at Block 401, an indication of groupings of SSB signals can be received. In an aspect, SSB processing component 252, e.g., in conjunction with processor(s) 212, memory 216, transceiver 202, communicating component 242, etc., can receive the indication of groupings of SSB signals. For example, SSB processing component 252 can receive the indication of the groupings from the base station 102 in a system information broadcast, such as RMSI, in RRC signaling, and/or the like, as described above. The indication may include information regarding request groupings of the SSBs, as described above, such as SSBs for a given beam that are partitioned to indicate a second beam that may be desired for further communications. Moreover, SSB processing component 252 may periodically receive dynamic grouping information, as described above.

In method 400, at Block 402, multiple SSB signals can be received from a base station. In an aspect, SSB processing component 252, e.g., in conjunction with processor(s) 212, memory 216, transceiver 202, communicating component 242, etc., can receive the multiple SSB signals from the base station (e.g., from base station 102, as generated and transmitted at Block 504). For example, the multiple SSB signals can be transmitted using beamforming based on different directional beams, as described, and the UE 104 can receive multiple SSB signals that may each have different signal properties. With reference to FIG. 6, for example, UE 104 can receive SSBidx1 602 and SSBidx2 604 transmitted by the base station 102. In another example, UE 104 may also receive SSBidx3 606 and/or SSBidx4 608, but these beams may not have desirable signal properties such to be considered for further communication procedures (e.g., SSBidx3 606 and/or SSBidx4 608 may have a RSRP that does not achieve an acceptable threshold). Similarly, with respect to FIG. 7, for example, UE 104 can receive SSBidx2 704 and/or adjacent beams SSBidx1 702 and/or SSBidx3 706 (e.g., in single transmission path scenario), or can receive SSBidx2 704 and/or beams SSBidx4 708 and/or SSBidxN 710 (e.g., in multiple transmission path scenario).

In method 400, at Block 404, a signature can be selected from a signature space of a first SSB of the multiple SSB signals. In an aspect, SSB processing component 252, e.g., in conjunction with processor(s) 212, memory 216, transceiver 202, communicating component 242, etc., can select the signature from the signature space of the first SSB of the multiple SSB signals. For example, the signature can correspond to one or more parameters related to initiating a random access (e.g., RACH) procedure for the SSB, which may include a tuple of a PRACH preamble and a RACH occasion (e.g., time and/or frequency resources over which the random access procedure can be initiated—such as by transmitting a first message, Msg 1, over the time and/or frequency resources). In this regard, in an example, the term "signature" as used herein can refer to the combination of a tuple of the RACH preamble, the RACH occasion (time and/or frequency resource), and/or any combination thereof. In one example, for initial access, SSB processing component 252 can receive, from the base station 102, a mapping between SSB and PBCH index and one or more Msg 1 signatures in RMSI, RRC signaling, etc., as described. In another example, for contention free random access in connected mode, the signature and RS pair can be configured to the UE 104 by PDCCH order, where the RS may be SSB or CSI-RS. In either case, the UE 104 can obtain the signature space for a given SSB.

In an example, SSB processing component 252 can determine to request random access based on the first SSB after determining that the first SSB is acceptable for requesting random access (e.g., based on determining a RSRP of the first SSB signal achieves a threshold level). Additional considerations may be made as well, such as identifying of a second SSB, which is also referred to herein as the "preferred SSB" (e.g., a SSB/beam having a strongest signal strength among multiple SSB signals) and/or determining that the preferred SSB cannot be used for requesting random access or that use thereof may not be desirable (e.g., due to missed opportunity in contention-based wireless access, due to latency before random access can be requested based on the preferred SSB, and/or the like). Based on determining to request random access based on the first SSB, SSB processing component 252 can select the signature from the signature space for the first SSB.

In one example, SSB processing component 252 can determine to select a signature for the first SSB that also indicates a preference for the preferred SSB. In an example, resources included in the signature space for the first SSB can be split into groups where each resource group can correspond to a different second (e.g., possibly preferred) SSB. In this regard, SSB processing component 252 can select a signature, from a group of signatures included in the first SSB, known to indicate preference for the preferred SSB. An example is depicted in FIG. 6, which shows an example of a signature space 610 for SSBidx1 602. The signature space 610 can be split into groups 612, 614, 616, 618, where group 612 includes signatures for requesting random access based on SSBidx1 602 without indicating preference for a preferred SSB, group 614 includes signatures for requesting random access based on SSBidx1 602 with an indication of preference for preferred SSBidx2 (e.g., has having a strongest signal strength), group 616 includes signatures for requesting random access based on SSBidx1 602 with an indication of preference for preferred SSBidx3 (e.g., has having a strongest signal strength), and group 618 includes signatures for requesting random access based on SSBidx1 602 with an indication of preference for preferred SSBidx4 (e.g., has having a strongest signal strength). In this example, UE 104 receiving SSBidx1 602 and SSBidx2 604 from the base station may determine SSBidx1 602 (e.g., a first SSB/beam)is acceptable to use in requesting random access, but SSBidx2 604 may be preferred (e.g., a preferred or second SSB/beam) as the corresponding beam may have signal strength stronger in the direction of UE 104 than the beam for SSBidx1 602. In this example, SSB processing component 252 may select a signature from group 614 to indicate the preference for SSBidx2. In one example, the grouping can be such that a given group of signatures can all have the same PRACH preamble sequence, and any two different groups can use different PRACH preamble sequences (e.g., the groups can be separated by looking at the preamble sequence component alone).

In an example, e.g., as described above in Block 502, SSB component 352 can create SSB request groups, in this regard, based on knowledge of the nested structures of beams (e.g., SSBidx2 604 can have its SSB request group in SSBidx1 602 signatures based on these beams being nested). In addition, SSB component 352 can determine to include SSBidx2 604 request group in SSBidx1 602 signatures, as indicated by request group 614, if replacing SSBidx2 with SSBidx1 can reduce RSRP by at most by a number, X, of decibels (dB). In an example, larger values of X can increase the number of SSB request groups and hence increase the chance of PRACH collisions. In one example, base station 102 can convey SSB request group information in RMSI for Contention Based RA, as described, in dedicated RRC Signaling for Contention free RA, etc.

In one example, in selecting the signature at Block 404, optionally at Block 406, it can be determined that a RSRP of the preferred SSB is within a threshold of the first SSB and/or at least a threshold higher than the first SSB. In an aspect, SSB processing component 252, e.g., in conjunction with processor(s) 212, memory 216, transceiver 202, communicating component 242, etc., can determine that the RSRP of the preferred SSB is within a threshold of the first SSB and/or at least a threshold higher than the first SSB. Thus, for example, SSB processing component 252 can determine to indicate the preferred SSB based at least in part on comparing the RSRP of the associated SSB signal with that of the first SSB signal in this regard. In an example, the network and/or base station 102 can convey the threshold(s) to the UE 104 in RMSI or other system information broadcast, or dedicated control information.

In the multiple transmission paths example above, UE 104 receiving SSBidx2 704 and SSBidx4 708 may determine SSBidx2 704 (e.g., a first SSB/beam) is acceptable to use in requesting random access, but SSBidx4 708 (e.g., a second SSB/beam) may be preferred as the corresponding beam may have a signal strength stronger in the multiple transmission path direction of UE 104 than the beam for SSBidx2 704. Thus, SSB processing component 252, in this example, may select a signature from group 722 in dynamic signature space 720 to indicate the preference for SSBidx4 708.

In addition, in an example, determining to select a signature to indicate preference for a different SSB can be based at least in part on, optionally at Block 408, receiving an indication to indicate a preferred SSB in the random access message. In an aspect, SSB processing component 252, e.g., in conjunction with processor(s) 212, memory 216, transceiver 202, communicating component 242, etc., can receive the indication to indicate the preferred SSB in the random access message. Similarly, in method 500, optionally at Block 506, an indication to indicate the preferred SSB in the random access message can be transmitted. In an aspect, SSB component 352, e.g., in conjunction with processor(s) 312, memory 316, transceiver 302, scheduling component 342, etc., can transmit the indication to indicate the preferred SSB in the random access message. In one example, SSB component 352 can transmit the indication in RMSI or other system information broadcast by the base station 102, as described.

In method 400, at Block 410, a random access message can be transmitted based on the signature, to the base station, including an indication of a preferred SSB of the multiple SSBs. In an aspect, RACH component 254, e.g., in conjunction with processor(s) 212, memory 216, transceiver 202, communicating component 242, etc., can transmit, based on the signature, the random access message to the base station (e.g., base station 102) including the indication of the preferred SSB of the multiple SSB signals. As described, in an example, RACH component 254 can use the signature to indicate the preferred SSB by selecting the signature from a grouping of signatures, in the signature space for the first SSB, where the grouping of signatures additionally indicate the preferred SSB. In another example, RACH component 254 may indicate the preferred SSB using a parameter or other value in the random access message contents.

In one example, in transmitting the random access message at Block 410, optionally at Block 412, a transmit power can be determined as a function of RSRP of the first SSB and of the preferred SSB. In an aspect, RACH component 254, e.g., in conjunction with processor(s) 212, memory 216, transceiver 202, communicating component 242, etc., can determine the transmit power for the random access message as a function of the RSRP of the first SSB and the RSRP of the preferred SSB (e.g., based on an average of the RSRPs, a maximum or minimum of the RSRPs, etc.). In addition, in an example, RACH component 254 can determine the transmit power based on also determining that SSB request groups are enabled, as described above (e.g., based on a configuration or indicator received in RMSI or other transmission from the base station 102). In these examples, RACH component 254 can transmit the random access message based on the determined transmit power.

In method 500, at Block 508, a random access message can be received, from a device and based on a signature associated with a first SSB, including an indication of a preferred SSB. In an aspect, RACH processing component 354, e.g., in conjunction with processor(s) 312, memory 316, transceiver 302, scheduling component 342, etc., can receive, from the device (e.g., UE 104) and based on a signature associated with the first SSB (e.g., in a signature space of the first SSB), the random access message including the indicator of the preferred SSB (e.g., as transmitted by UE 104 at Block 408). For example, RACH processing component 354 can receive the random access response message in a RACH occasion (e.g., over time and/or frequency resources advertised for the first SSB, as described) and based on a tuple of a RACH preamble (e.g., as also advertised for the first SSB). As described, the tuple of the RACH preamble and the RACH occasion may also be configured in a group of preamble/occasions (e.g., signatures) for indicating preference for the preferred SSB.

In method 500, at Block 510, the first SSB and the preferred SSB can be determined based on the random access message. In an aspect, RACH processing component 354, e.g., in conjunction with processor(s) 312, memory 316, transceiver 302, scheduling component 342, etc., can determine, based on the random access message, the first SSB and the preferred SSB. For example, RACH processing component 354 can determine the first SSB based on the signature of the random access message (e.g., based on the tuple of the RACH preamble and/or RACH occasion information), and can determine the preferred SSB based on the signature as well or on one or more parameters identified in the random access message. For example, RACH processing component 354 can determine whether the signature is selected from, or otherwise corresponds to, a group used to indicate preference for the preferred SSB. In the example in FIG. 6, for instance, RACH processing component 354 can determine whether the signature is from one or more of the groups 614, 616, 618 to indicate preference for a preferred SSB or from group 612 used to indicate no preferred SSB. Where the signature is selected from one of groups 614, 616, 618, RACH processing component 354 can determine the associated preferred SSB. As described, SSB component 352 can have created the request groups of signatures and/or notified one or more UEs of the groups (e.g., in RMSI or other broadcast signaling) and can accordingly determine SSB information based on the received signature information. Based on the preferred SSB, for example, RACH processing component 354 can modify the RACH procedure to instead refer to the preferred SSB, as described herein.

In method 500, optionally at Block 512, a second random access message beamformed to indicate a QCL of the first SSB or preferred SSB can be transmitted to the device and in response to the random access message. In an aspect, RACH processing component 354, e.g., in conjunction with processor(s) 312, memory 316, transceiver 302, scheduling component 342, etc., can transmit, to the device (e.g., UE 104) and in response to the random access message, the second random access message beamformed to indicate the QCL of the first SSB or preferred SSB, as described further herein. In addition, for example, RACH processing component 354 can transmit the second random access message (e.g., Msg 2 in a 4-step RACH procedure or Msg B in a two-step RACH procedure), which can carry the random access response (RAR)) with a RA-RNTI assigned to the UE 104), based on the RA-RNTI. In an example, the UE 104 can use the RA-RNTI to detect the message over certain channel resources (e.g., PDCCH/PDSCH)searching a common search space, UE-specific search space, etc.

In method 400, optionally at Block 414, a second random access message can be received, from the base station and in response to the random access message. In an aspect, RACH component 254, e.g., in conjunction with processor(s) 212, memory 216, transceiver 202, communicating component 242, etc., can receive, from the base station and in response to the random access message, the second random access message. For example, RACH component 254 can receive the second random access message over resources indicated for Msg 2, which may include PDCCH and/or PDSCH resources over which the base station 102 can transmit the second random access message (e.g., Msg 2).

In an example, receiving the signature determined to be in a certain SSB request group (e.g., SSBidx2) at Block 508 can indicate a request of change in beam used from that for the first SSB (e.g., SSBidx1) to the preferred SSB (e.g., SSBidx2). In one example, based on reception of Msg 1, from RACH occasion and Preamble, RACH processing component 354 can first identify the first SSB, and can further change the beam from Msg 2 onwards, Msg 3 onwards, or Msg 4 onwards, as described further herein. For example, RACH processing component 354 can change the beam from Msg 2 onwards at least in part by identifying the preferred SSB (e.g., SSBidx2 by knowledge of group membership, as described), and committing to transmissions in QCL relationship with the preferred SSB for Msg 2 and Msg 4. In this example, as described herein, the UE 104 may assume PDCCH and PDSCH for Msg2 have a QCL relationship with the preferred SSB. In other examples, RACH processing component 354 can change the beam from Msg 3 or Msg 4 (which can be for contention resolution) onwards, and can transmit Msg 2 assuming QCL relationship with the first SSB (e.g., but Msg 3 and/or Msg 4, are sent with QCL relationship with the preferred SSB). An example is illustrated in FIG. 8.

Figure 8:
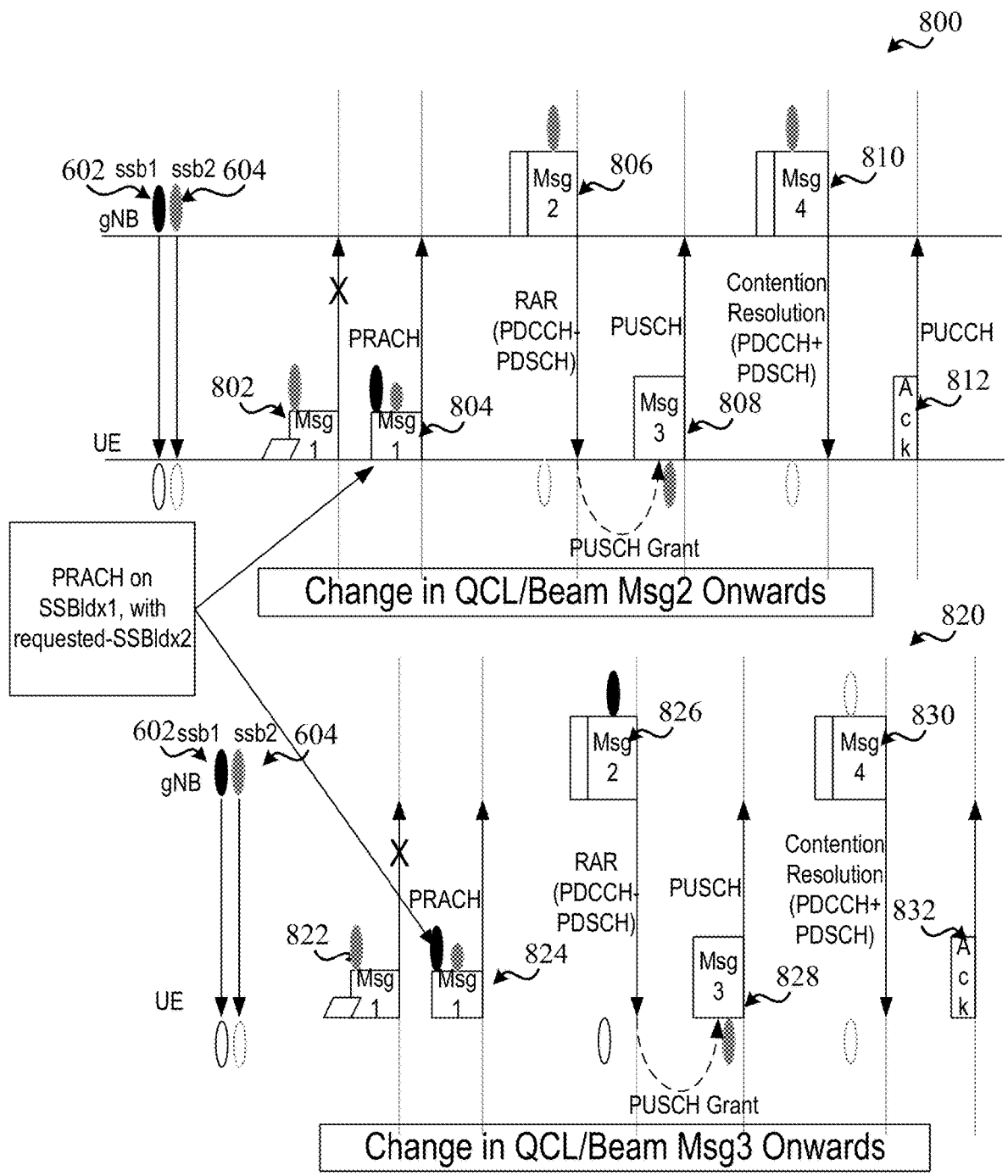
FIG. 8 illustrates examples of random access procedures, in accordance with various aspects of the present disclosure.

FIG. 8 illustrates an example of a RACH procedure 800 where multiple SSBs 602, 604 are received, in accordance with various aspects of the present disclosure. In RACH procedure 800, the UE can send Msg 1 indicating the first SSB (e.g., SSBidx1) and the preferred SSB (e.g., SSBidx2) at 804. In one example, this can be based on missing the opportunity to send Msg 1 for the preferred SSB at 802. In any case, the base station can receive Msg 1 and can respond with Msg 2 with QCL for the preferred SSB at 806. Based on receiving the response at 806, the UE can transmit Msg 3 with QCL for the preferred SSB at 808, and base station can send Msg 4 with QCL for the preferred SSB at 810. The UE can acknowledge Msg 4 at 812.

FIG. 8 also illustrates an example of a RACH procedure 820 where the base station can transmit Msg 2 with QCL for the first SSB, and the UE can transmit Msg 3 with QCL for the preferred SSB. In this example, multiple SSBs 602, 604 are received. In RACH procedure 820, the UE can send Msg 1 indicating the first SSB (e.g., SSBidx1) and the preferred SSB (e.g., SSBidx2) at 824. In one example, this can be based on missing the opportunity to send Msg 1 for the preferred SSB at 822. In any case, the base station can receive Msg 1 and can respond with Msg 2 with QCL for the first SSB at 826. Based on receiving the response at 826, the UE can transmit Msg 3 with QCL for the preferred SSB at 828, and base station can send Msg 4 with QCL for the preferred SSB at 830. The UE can acknowledge Msg 4 at 832.

Moreover, for example, including an indication of the preferred SSB in Msg 2 can enable overlapping request groups. For example, SSB component 352 can determine and indicate multiple preferred SSBs that can be in a single group. For example, the signature space for the first beam (e.g., SSBidx1) may include a request group that has signatures that can correspond to multiple preferred beams (e.g., SSBidx2 and SSBidx3). In this example, where the SSB processing component 252 determines that multiple preferred SSBs have desirable signal properties (e.g., when compared with the acceptable SSB, when compared with one another, etc.), RACH component 254 can transmit Msg 1 based on a signature to indicate the multiple preferred SSBs. In this example, the base station 102 can determine which of the multiple SSBs to assign to the UE 104, and RACH processing component 354 can indicate, in Msg 2, which of the multiple preferred SSBs are assigned for the UE 104 to use.

In one example, to indicate QCL for the first SSB or preferred SSB in transmitting the second random access message at Block 512, optionally at Block 514, the second random access message can be transmitted based on a first preamble index or first RA-RNTI associated with the first SSB or on a second preamble or second RA-RNTI associated with the preferred SSB. In an aspect, RACH processing component 354, e.g., in conjunction with processor(s) 312, memory 316, transceiver 302, scheduling component 342, etc., can transmit the second random access message based on a first preamble index or first RA-RNTI associated with the first SSB (e.g., for transmitting for the preferred SSB in Msg 3 or Msg 4 onwards) or on a second preamble or second RA-RNTI associated with the preferred SSB (e.g., for transmitting for the preferred SSB in Msg 2 onwards). For example, RACH processing component 354 can be configured to transmit the second random access message based on one of the first preamble index or first RA-RNTI associated with the first SSB, or the second preamble or second RA-RNTI associated with the preferred SSB. In another example, RACH processing component 354 can determine whether to transmit the second random access message based on the first preamble index or first RA-RNTI associated with the first SSB, or based on the second preamble or second RA-RNTI associated with the preferred SSB according to one or more other determinations.

In this example, in method 400, optionally at Block 416, it can be determined whether the second random access message indicates the QCL with the first SSB or the preferred SSB. In an aspect, RACH component 254, e.g., in conjunction with processor(s) 212, memory 216, transceiver 202, communicating component 242, etc., can determine whether the second random access message indicates the QCL with the first SSB or the preferred SSB. In an example, RACH component 254 can determine how to generate a third random access message based on whether the second random access message indicates the QCL with the first SSB or the preferred SSB, as described further herein.

In one example, in determining whether the second random access message indicates the QCL with the first SSB or the preferred SSB at Block 416, optionally at Block 418, the second random access message can be monitored for based on a first preamble index or first RA-RNTI associated with the first SSB or on a second preamble index or second RA-RNTI associated with the preferred SSB. In an aspect, RACH component 254, e.g., in conjunction with processor (s) 212, memory 216, transceiver 202, communicating component 242, etc., can monitor for the second random access message (e.g., in PDCCH/PDSCH resources from the base station 102) based on the first preamble index or first RA-RNTI associated with the first SSB (e.g., as in Msg 2 826 in FIG. 8) or a second preamble index or second RA-RNTI associated with the preferred SSB (e.g., as in Msg 2 806 in FIG. 8), such to determine whether the second preamble message is associated with the first SSB or preferred SSB.

In one example, RACH processing component 354 can use the RAPID in payload of RAR in Msg 2 to indicate change to QCL for beam of the preferred SSB. In one example, the change can be indicated by a change in RAPID or no change in RAPID (and the UE 104 can be configured with information for determining whether the QCL change occurs based on whether or not the RAPID is changed). Thus, in one example, RAPID can be left unchanged if beam is not changed, e.g., QCL for beam of the first SSB is maintained for the procedure, and in another example, RAPID can be changed to indicate unchanged beam/QCL to the first SSB. The change mapping from one RAPID to another can be deterministically known and agreed in advance to both UE 104 and base station 102 via configuration. In this example, RACH component 254 can look for a first RAPID as a function of a preamble of the first SSB and for a second RAPID as a function of a preamble for the second SSB in RAR payload and can decide whether to modify QCL assumptions based on which RAPID is detected.

In another example, the change in QCL assumption can be conveyed deterministically by change in RA-RNTI. For example, RACH processing component 354 can use the RA-RNTI to indicate whether the second random access message is changed in QCL to the preferred SSB or not. For example, the RA-RNTI can conventionally be used to scramble cyclic redundancy check (CRC) for PDCCH/PDSCH for Msg 2 and can be computed from RACH-occasion for received PRACH. In one example, RACH processing component 354 can change the RA-RNTI to indicate change to QCL for beam of the preferred SSB or can leave the RA-RNTI unchanged if beam is not changed (e.g., where QCL for beam for the first SSB is maintained for the procedure). In another example, RACH processing component 354 can change the RA-RNTI to indicate unchanged beam/QCL to the first SSB, and no-change can indicate new beam/QCL to the preferred SSB. The change mapping from one RA-RNTI to another can be deterministically known and agreed in advance to both UE 104 and base station 102. In this example, RACH component 254 can look for more than one RA-RNTI, such as a first RA-RNTI as a function of the RACH preamble for the first SSB and a second RA-RNTI as a function of the RACH preamble for the first SSB and the preferred SSB in RAR payload and can decide whether to modify QCL assumptions based on which RA-RNTI is detected.

In another example, in transmitting the second random access message at Block 512, optionally at Block 516, an association with the preferred SSB can be indicated in a payload of the second random access message. In an aspect, RACH processing component 354, e.g., in conjunction with processor(s) 312, memory 316, transceiver 302, scheduling component 342, etc., can indicate, in the payload of the second random access message, the association with the preferred SSB. In addition, in this example, in determining whether the second random access message indicates the QCL with the first SSB or the preferred SSB at Block 416, optionally at Block 420, it can be determined whether a payload of the second random access message indicates association with the preferred SSB. In an aspect, RACH component 254, e.g., in conjunction with processor(s) 212, memory 216, transceiver 202, communicating component 242, etc., can determine whether a payload of the second random access message indicates association with the preferred SSB. For example, the message can indicate association in an indicator parameter within the payload.

In either case, in an example, for Msg 3, the UE 104 with beam-correspondence may assume to transmit Msg 3 based on a beam corresponding to QCL with the preferred SSB. Thus, for example, in method 400, optionally at Block 422, a third random access message beamformed to indicate QCL of the first SSB or the preferred SSB can be transmitted to the base station and in response to the second random access message. In an aspect, RACH component 254, e.g., in conjunction with processor(s) 212, memory 216, transceiver 202, communicating component 242, etc., can transmit, to the base station (e.g., base station 102) and in response to the second random access message (e.g., Msg 2), a third random access message (e.g., Msg 3, such as shown at 808/828) beamformed to indicate QCL of the preferred SSB. For example, RACH component 254 can beamform Msg 3 based on the beamforming used to transmit the preferred SSB.

In one example, RACH component 254 can determine to beamform the third random access message to indicate the QCL of the preferred SSB based at least in part on an indication of the preferred SSB in the second random access message. For example, the indication may include an explicit indication in the second random access message indicating to use the preferred SSB in the third random access message. In another example, the indication may include an explicit indication where the second random access message may be beamformed based on the QCL of the first SSB, an implicit indication of the beamforming of the second random access message based on the QCL of the preferred SSB, etc.

In method 500, optionally at Block 518, a third random access message beamformed to indicate QCL of the preferred SSB can be received from the device and in response to the second random access message. In an aspect, RACH processing component 354, e.g., in conjunction with processor(s) 312, memory 316, transceiver 302, scheduling component 342, etc., can receive, from the device (e.g., UE 104) and in response to the second random access message (e.g., Msg 2), the third random access message (e.g., Msg 3) beamformed to indicate QCL of the preferred SSB. In one example, RACH processing component 354 can determine to beamform Msg 4 based on the originally received Msg 1 indicating the preferred SSB and/or based on receiving Msg 3 beamformed to indicate QCL of the preferred SSB.

In method 500, optionally at Block 520, a fourth random access message beamformed to indicate QCL of the preferred SSB can be received from the device and in response to the third random access message. In an aspect, RACH processing component 354, e.g., in conjunction with processor(s) 312, memory 316, transceiver 302, scheduling component 342, etc., can transmit, to the device (e.g., UE 104) and in response to the third random access message (e.g., Msg 3), the fourth random access message (e.g., Msg 4, such as shown at 810/830) beamformed to indicate QCL of the preferred SSB.

In method 400, optionally at Block 424, a fourth random access message beamformed to indicate QCL of the first SSB or the preferred SSB can be received from the base station and in response to the third random access message. In an aspect, RACH component 254, e.g., in conjunction with processor(s) 212, memory 216, transceiver 202, communicating component 242, etc., can receive, from the base station (e.g., base station 102) and in response to the third random access message, the fourth random access message beamformed to indicate QCL of the preferred SSB.

Figure 9:
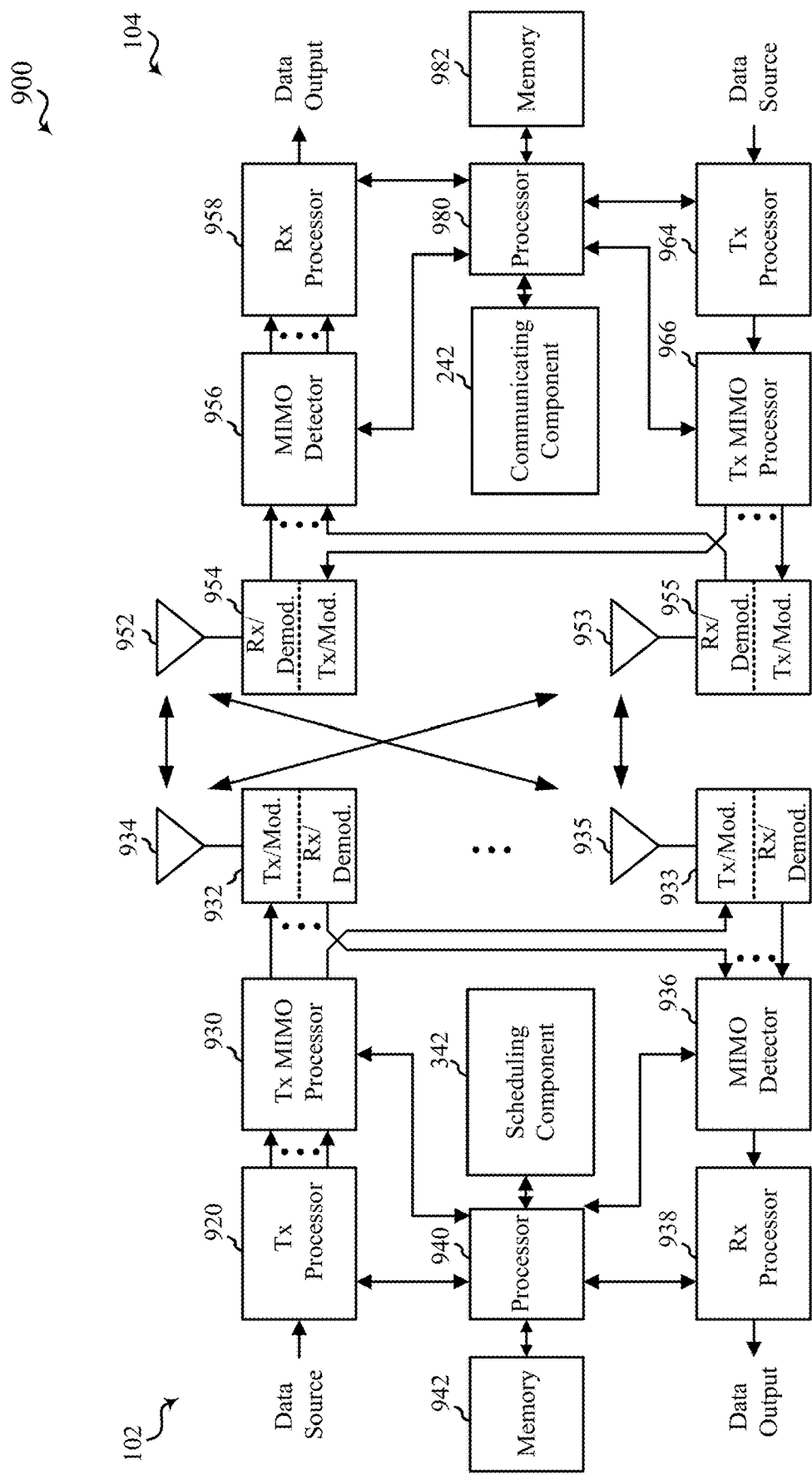
FIG. 9 is a block diagram illustrating an example of a MIMO communication system including a base station and a UE, in accordance with various aspects of the present disclosure.

FIG. 9 is a block diagram of a MIMO communication system 900 including a base station 102 and a UE 104. The MIMO communication system 900 may illustrate aspects of the wireless communication access network 100 described with reference to FIG. 1. The base station 102 may be an example of aspects of the base station 102 described with reference to FIG. 1. The base station 102 may be equipped with antennas 934 and 935, and the UE 104 may be equipped with antennas 952 and 953. In the MIMO communication system 900, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 920 may receive data from a data source. The transmit processor 920 may process the data. The transmit processor 920 may also generate control symbols or reference symbols. A transmit MIMO processor 930 may perform spatial processing (e.g., precoding) on data symbols, control symbols, or reference symbols, if applicable, and may provide output symbol streams to the transmit modulator/demodulators 932 and 933. Each modulator/demodulator 932 through 933 may process a respective output symbol stream (e.g., for OFDM, etc.) to obtain an output sample stream. Each modulator/demodulator 932 through 933 may further process (e.g., convert to analog, amplify, filter, and upconvert) the output sample stream to obtain a DL signal. In one example, DL signals from modulator/demodulators 932 and 933 may be transmitted via the antennas 934 and 935, respectively.

The UE 104 may be an example of aspects of the UEs 104 described with reference to FIGS. 1-2. At the UE 104, the UE antennas 952 and 953 may receive the DL signals from the base station 102 and may provide the received signals to the modulator/demodulators 954 and 955, respectively. Each modulator/demodulator 954 through 955 may condition (e.g., filter, amplify, downconvert, and digitize) a respective received signal to obtain input samples. Each modulator/demodulator 954 through 955 may further process the input samples (e.g., for OFDM, etc.) to obtain received symbols. A MIMO detector 956 may obtain received symbols from the modulator/demodulators 954 and 955, perform MIMO detection on the received symbols, if applicable, and provide detected symbols. A receive (Rx) processor 958 may process (e.g., demodulate, deinterleave, and decode) the detected symbols, providing decoded data for the UE 104 to a data output, and provide decoded control information to a processor 980, or memory 982.

The processor 980 may in some cases execute stored instructions to instantiate a communicating component 242 (see e.g., FIGS. 1 and 2).

On the uplink (UL), at the UE 104, a transmit processor 964 may receive and process data from a data source. The transmit processor 964 may also generate reference symbols for a reference signal. The symbols from the transmit processor 964 may be precoded by a transmit MIMO processor 966 if applicable, further processed by the modulator/demodulators 954 and 955 (e.g., for SC-FDMA, etc.), and be transmitted to the base station 102 in accordance with the communication parameters received from the base station 102. At the base station 102, the UL signals from the UE 104 may be received by the antennas 934 and 935, processed by the modulator/demodulators 932 and 933, detected by a MIMO detector 936 if applicable, and further processed by a receive processor 938. The receive processor 938 may provide decoded data to a data output and to the processor 940 or memory 942.

The processor 940 may in some cases execute stored instructions to instantiate a scheduling component 342 (see e.g., FIGS. 1 and 3).

The components of the UE 104 may, individually or collectively, be implemented with one or more application specific integrated circuits (ASICs) adapted to perform some or all of the applicable functions in hardware. Each of the noted modules may be a means for performing one or more functions related to operation of the MIMO communication system 900. Similarly, the components of the base station 102 may, individually or collectively, be implemented with one or more ASICs adapted to perform some or all of the applicable functions in hardware. Each of the noted components may be a means for performing one or more functions related to operation of the MIMO communication system 900.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

In the following, an overview of further examples is provided:

1. A method for wireless communication, comprising:
    receiving multiple synchronization signal block (SSB) signals from a base station, wherein the multiple SSB signals are each beamformed based on a different directional beam;
    selecting a signature from a signature space of a first SSB of the multiple SSB signals; and
    transmitting, based on the signature, a random access message to the base station, wherein the random access message includes an indicator of a preferred SSB of the multiple SSB signals.

2. The method of example 1, wherein selecting the signature includes selecting the signature as the indicator of the preferred SSB.

3. The method of example 2, wherein the signature space of the first SSB includes multiple groups of signatures, wherein each group of signatures is further associated with a different preferred SSB that is different from the first SSB.

4. The method of example 3, wherein for a given group of signatures, the signatures include the same random access preamble sequence.

5. The method of any of examples 1 to 4, further comprising receiving, from the base station and in response to the random access message, a second random access message, wherein the second random access message is beamformed to indicate a quasi-colocation with the preferred SSB.

6. The method of example 5, further comprising:
    monitoring for the second random access message based on a first preamble index associated with the first SSB and a second preamble index associated with the preferred SSB; and
    determining that the second random access message indicates the quasi-colocation with the preferred SSB based at least in part on whether the second random access message is received based on the first preamble index or the second preamble index.

7. The method of any of examples 5 or 6, further comprising:
    monitoring for the second random access message based on a first random access radio network temporary identifier (RA-RNTI) associated with the first SSB and a second RA-RNTI associated with the first SSB and the preferred SSB; and
    determining that the second random access message indicates the quasi-colocation with the preferred SSB based at least in part on whether the second random access message is received based on the first RA-RNTI or the second RA-RNTI.

8. The method of any of examples 1 to 7, further comprising receiving, from the base station and in response to the random access message, a second random access message, wherein the second random access message is beamformed to indicate a quasi-colocation with the first SSB.

9. The method of example 8, further comprising:
    monitoring for the second random access message based on a first preamble index associated with the first SSB and a second preamble index associated with the preferred SSB; and
    determining that the second random access message indicates the quasi-colocation with the first SSB based at least in part on whether the second random access message is received based on the first preamble index or the second preamble index.

10. The method of any of examples 8 or 9, further comprising:
    monitoring for the second random access message based on a first random access radio network temporary identifier (RA-RNTI) associated with the first SSB and a second RA-RNTI associated with the first SSB and the preferred SSB; and
    determining that the second random access message indicates the quasi-colocation with the first SSB based at least in part on whether the second random access message is received based on the first RA-RNTI or the second RA-RNTI.

11. The method of any of examples 8 to 10, further comprising transmitting, to the base station and in response to the second random access message, a third random access message, wherein the third random access message is beamformed to indicate a preferred quasi-colocation with the preferred SSB.

12. The method of example 11, further comprising determining to beamform the third random access message to indicate the preferred quasi-colocation with the preferred SSB based at least in part on an indication of the preferred SSB in the second random access message.

13. The method of any of examples 11 or 12, further comprising receiving, from the base station and in response to the third random access message, a fourth random access message, wherein the fourth random access message is beamformed to indicate the preferred quasi-colocation with the preferred SSB.

14. The method of any of examples 1 to 13, further comprising receiving, from the base station and in response to the random access message, a second random access message, wherein the second random access message indicates, in a payload, a quasi-colocation with the preferred SSB.

15. The method of any of examples 1 to 14, wherein including the indicator of the preferred SSB is based at least in part on signaling from the base station indicating groups of SSBs, wherein at least one group includes the first SSB and the preferred SSB.

16. The method of any of examples 1 to 15, further comprising determining to select the signature of the signature space of the first SSB and to indicate the preferred SSB based at least in part on at least one of determining that a reference signal power of the preferred SSB signal is within a threshold power of the first SSB signal, determining that the reference signal power of the preferred SSB signal is at least a threshold higher than the first SSB signal.

17. The method of any of examples 1 to 16, wherein transmitting the random access message is based on a transmit power that is a function of a reference signal power of the preferred SSB signal and the first SSB signal.

18. The method of any of examples 1 to 17, wherein including the indicator of the preferred SSB is based at least in part on determining that SSB request groups are enabled in remaining minimum system information (RMSI) signaling from the base station.

19. The method of any of examples 1 to 18, further comprising receiving an indication of the signature space of the first SSB having groups of signatures, wherein each group corresponds to indicating one of the multiple SSBs as the preferred SSB.

20. The method of example 19, wherein the signature space is dynamically indicated in periodically received system information.

21. A method for wireless communication, comprising:
transmitting multiple synchronization signal block (SSB) signals, wherein the multiple SSB signals are each beamformed based on a different directional beam;
receiving, from a device and based on a signature of a first SSB of the multiple SSB signals, a random access message, wherein the random access message includes an indicator of a preferred SSB of the multiple SSB signals; and
determining, based on the random access message, the first SSB and the preferred SSB.

22. The method of example 21, wherein determining the preferred SSB is based at least in part on the signature of the first SSB.

23. The method of example 22, wherein a signature space of the first SSB includes multiple groups of signatures, wherein each group of signatures is further associated with a different preferred SSB that is different from the first SSB, and wherein determining the preferred SSB includes determining to which group of the multiple groups of signatures the signature belongs.

24. The method of any of examples 21 to 23, further comprising transmitting, to the device and in response to the random access message, a second random access message, wherein the second random access message is beamformed to indicate a quasi-colocation with the preferred SSB, wherein transmitting the second random access message is based on one of a first preamble index associated with the first SSB or a second preamble index associated with the preferred SSB to indicate a quasi-colocation with the preferred SSB.

25. The method of any of examples 21 to 24, further comprising transmitting, to the device and in response to the random access message, a second random access message, wherein the second random access message is beamformed to indicate a quasi-colocation with the first SSB, wherein transmitting the second random access message is based on one of a first preamble index associated with the first SSB or a second preamble index associated with the preferred SSB to indicate a quasi-colocation with the first SSB.

26. The method of example 25, further comprising receiving, from the device and in response to the second random access message, a third random access message, wherein the third random access message is beamformed to indicate a preferred quasi-colocation with the preferred SSB.

27. The method of any of examples 21 to 26, further comprising transmitting, to the device, an indication of the signature space of the first SSB having groups of signatures, wherein each group corresponds to indicating one of the multiple SSBs as the preferred SSB.

28. The method of example 27, wherein the signature space is dynamically indicated in periodically transmitted system information.

29. An apparatus for wireless communication, comprising:
a transceiver;
a memory configured to store instructions; and
one or more processors communicatively coupled with the transceiver and the memory, wherein the one or more processors are configured to:
receive multiple synchronization signal block (SSB) signals from a base station, wherein the multiple SSB signals are each beamformed based on a different directional beam;
select a signature from a signature space of a first SSB of the multiple SSB signals; and
transmit, based on the signature, a random access message to the base station, wherein the random access message includes an indicator of a preferred SSB of the multiple SSB signals.

30. The apparatus of example 29, wherein the one or more processors are configured to select the signature as the indicator of the preferred SSB.

31. The apparatus of example 30, wherein the signature space of the first SSB includes multiple groups of signatures, wherein each group of signatures is further associated with a different preferred SSB that is different from the first SSB.

32. The apparatus of any of examples 29 to 31, wherein the one or more processors are further configured to:
monitor for a second random access message based on a first preamble index associated with the first SSB and a second preamble index associated with the preferred SSB;
receive, from the base station and in response to the random access message, the second random access message, wherein the second random access message is beamformed to indicate a quasi-colocation with the preferred SSB; and
determine that the second random access message indicates the quasi-colocation with the preferred SSB based at least in part on whether the second random access message is received based on the first preamble index or the second preamble index.

33. The apparatus of any of examples 29 to 32, wherein the one or more processors are further configured to:
monitor for a second random access message based on a first random access radio network temporary identifier (RA-RNTI) associated with the first SSB and a second RA-RNTI associated with the first SSB and the preferred SSB;
receive, from the base station and in response to the random access message, the second random access message, wherein the second random access message is beamformed to indicate a quasi-colocation with the preferred SSB; and
determine that the second random access message indicates the quasi-colocation with the preferred SSB based at least in part on whether the second random access message is received based on the first RA-RNTI or the second RA-RNTI.

34. The apparatus of any of examples 29 to 33, wherein the one or more processors are further configured to receive, from the base station and in response to the random access message, a second random access message, wherein the second random access message is beamformed to indicate a quasi-colocation with the first SSB.

35. The apparatus of example 34, wherein the one or more processors are configured to transmit, to the base station and in response to the second random access message, a third random access message, wherein the third random access message is beamformed to indicate a preferred quasi-colocation with the preferred SSB.

36. The apparatus of example 35, wherein the one or more processors are further configured to receive, from the base station and in response to the third random access message, a fourth random access message, wherein the fourth random access message is beamformed to indicate the preferred quasi-colocation with the preferred SSB.

37. The apparatus of any of examples 29 to 36, wherein the one or more processors are further configured to determine to select the signature of the signature space of the first SSB and to indicate the preferred SSB based at least in part on at least one of determining that a reference signal power of the preferred SSB signal is within a threshold power of the first SSB signal, determining that the reference signal power of the preferred SSB signal is at least a threshold higher than the first SSB signal.

38. The apparatus of any of examples 29 to 37, wherein including the indicator of the preferred SSB is based at least in part on determining that SSB request groups are enabled in remaining minimum system information (RMSI) signaling from the base station.

39. The apparatus of any of examples 29 to 38, wherein the one or more processors are further configured to receive an indication of the signature space of the first SSB having groups of signatures, wherein each group corresponds to indicating one of the multiple SSBs as the preferred SSB, wherein the signature space is dynamically indicated in periodically received system information.

40. An apparatus for wireless communication, comprising:
a transceiver;
a memory configured to store instructions; and
one or more processors communicatively coupled with the transceiver and the memory, wherein the one or more processors are configured to:
transmit multiple synchronization signal block (SSB) signals, wherein the multiple SSB signals are each beamformed based on a different directional beam;
receive, from a device and based on a signature of a first SSB of the multiple SSB signals, a random access message, wherein the random access message includes an indicator of a preferred SSB of the multiple SSB signals; and
determine, based on the random access message, the first SSB and the preferred SSB.

41. The apparatus of example 40, wherein the one or more processors are configured to determine the preferred SSB based at least in part on the signature of the first SSB.

42. The apparatus of example 41, wherein a signature space of the first SSB includes multiple groups of signatures, wherein each group of signatures is further associated with a different preferred SSB that is different from the first SSB, and wherein the one or more processors are configured to determine the preferred SSB at least in part by determining to which group of the multiple groups of signatures the signature belongs.

43. The apparatus of any of examples 40 to 42, wherein the one or more processors are configured to transmit, to the device and in response to the random access message, a second random access message, wherein the second random access message is beamformed to indicate a quasi-colocation with the preferred SSB, wherein transmitting the second random access message is based on one of a first preamble index associated with the first SSB or a second preamble index associated with the preferred SSB to indicate a quasi-colocation with one of the preferred SSB or the first SSB.

44. The apparatus of any of examples 40 to 43, wherein the one or more processors are configured to transmit, to the device, an indication of a signature space of the first SSB having groups of signatures, wherein each group corresponds to indicating one of the multiple SSBs as the preferred SSB, wherein the signature space is dynamically indicated in periodically transmitted system information.

What is claimed is:

1. A method for wireless communication, comprising:
receiving multiple synchronization signal blocks (SSBs) from a base station, wherein the multiple SSBs are each beamformed based on a different directional beam;
selecting a signature from a signature space of a first SSB of the multiple SSBs, wherein the signature indicates a random access preamble and random access resources associated with the first SSB, wherein the signature space of the first SSB includes multiple groups of signatures, each signature in the signature space indicating a random access preamble and random access resources for indicating a selection for using the first SSB, wherein each group of signatures of the multiple groups of signatures is further associated with indicating a preference for using a preferred SSB that is different from the first SSB, such that selection of the signature indicates both of the selection for using the first SSB and the preference for using the preferred SSB for subsequent communications;
transmitting, based on the signature, a random access message including the random access preamble to the base station over the random access resources associated with the first SSB;
receiving, in response to the random access message, a second random access message from the base station, wherein the second random access message indicates quasi-colocation of the second random access message with one of the first SSB or the preferred SSB; and
determining whether the second random access message indicates quasi-colocation of the second random access message with the first SSB or indicates quasi-colocation of the second random access message with the preferred SSB.

2. The method of claim 1, wherein for a given group of signatures, the signatures include the same random access preamble sequence.

3. The method of claim 1, further comprising receiving, from the base station and in response to the random access message, the second random access message, wherein the second random access message is beamformed to indicate a quasi-colocation with the preferred SSB.

4. The method of claim 1, wherein determining whether the second random access message indicates quasi-colocation with the first SSB or second SSB is based on determining whether the second random access message indicates a first preamble index associated with the first SSB or a second preamble index associated with the preferred SSB.

5. The method of claim 1, wherein determining whether the second random access message indicates quasi-colocation with the first SSB or second SSB is based on determining whether the second random access message indicates a first random access radio network temporary identifier (RA-RNTI) associated with the first SSB or and a second RA-RNTI associated with the first SSB and the preferred SSB.

6. The method of claim 1, wherein the second random access message is beamformed to indicate a quasi-colocation with the first SSB.

7. The method of claim 1, further comprising transmitting, to the base station and in response to the second random access message and based on whether the second random access message indicates quasi-colocation with the first SSB or indicates quasi-colocation with the preferred SSB, a third random access message.

8. The method of claim 7, further comprising determining to beamform the third random access message to indicate a preferred quasi-colocation with the preferred SSB based at least in part on an indication of the preferred SSB in the second random access message.

9. The method of claim 7, further comprising receiving, from the base station and in response to the third random access message, a fourth random access message, wherein the fourth random access message is beamformed to indicate the preferred quasi-colocation with the preferred SSB.

10. The method of claim 1, further comprising receiving, from the base station and in response to the random access message, the second random access message, wherein the second random access message indicates, in a payload, a quasi-colocation with the preferred SSB.

11. The method of claim 1, wherein selecting the signature to indicate both of the selection for using the first SSB and the preference for using the preferred SSB for subsequent communications is based at least in part on signaling from the base station indicating groups of SSBs, wherein at least one group includes the first SSB and the preferred SSB.

12. The method of claim 1, further comprising determining to select the signature of the signature space of the first SSB and to indicate the preferred SSB based at least in part on at least one of determining that a reference signal power of the preferred SSB is within a threshold power of the first SSB, or determining that the reference signal power of the preferred SSB is at least a threshold higher than the first SSB.

13. The method of claim 1, wherein transmitting the random access message is based on a transmit power that is a function of a reference signal power of the preferred SSB and the first SSB.

14. The method of claim 1, wherein selecting the signature to indicate both of the selection for using the first SSB and the preference for using the preferred SSB for subsequent communications is based at least in part on determining that SSB request groups are enabled in remaining minimum system information (RMSI) signaling from the base station.

15. The method of claim 1, further comprising receiving an indication of the signature space of the first SSB having groups of signatures, wherein each group corresponds to indicating one of the multiple SSBs as the preferred SSB.

16. The method of claim 15, wherein the signature space is dynamically indicated in periodically received system information.

17. A method for wireless communication, comprising:
transmitting multiple synchronization signal blocks (SSBs), wherein the multiple SSBs are each beamformed based on a different directional beam;
receiving, from a device and based on a signature of a first SSB of the multiple SSBs, a random access message including a random access preamble associated with the first SSB over random access resources associated with the first SSB, wherein the random access message includes an indicator of a selection of the first SSB and a preferred SSB of the multiple SSBs that is different than the first SSB;
determining, based on the random access message, the first SSB and the preferred SSB, wherein a signature space of the first SSB includes multiple groups of signatures, each signature in the signature space indicating a random access preamble and random access resources for indicating a selection for using the first SSB, wherein each group of signatures is further associated with indicating a preference for using a preferred SSB that is different from the first SSB, such that selection of the signature indicates both of the selection for using the first SSB and the preference for using the preferred SSB, and wherein determining the preferred SSB includes determining to which group of the multiple groups of signatures the signature belongs; and
transmitting, to the device and in response to the random access message, a second random access message, wherein the second random access message is beamformed to indicate a quasi-colocation of the second random access message with the first SSB.

18. The method of claim 17, wherein transmitting the second random access message is based on one of a first preamble index associated with the first SSB or a second preamble index associated with the preferred SSB to indicate a quasi-colocation with the first SSB.

19. The method of claim 18, further comprising receiving, from the device and in response to the second random access message, a third random access message, wherein the third random access message is beamformed to indicate a preferred quasi-colocation with the preferred SSB.

20. The method of claim 17, further comprising transmitting, to the device, an indication of a signature space of the first SSB having groups of signatures, wherein each group corresponds to indicating one of the multiple SSBs as the preferred SSB.

21. The method of claim 20, wherein the signature space is dynamically indicated in periodically transmitted system information.

22. An apparatus for wireless communication, comprising:
a transceiver;
a memory configured to store instructions; and
one or more processors communicatively coupled with the transceiver and the memory, wherein the one or more processors are configured to:
receive multiple synchronization signal blocks (SSBs) from a base station, wherein the multiple SSBs are each beamformed based on a different directional beam;

select a signature from a signature space of a first SSB of the multiple SSBs, wherein the signature indicates a random access preamble and random access resources associated with the first SSB, wherein the signature space of the first SSB includes multiple groups of signatures, each signature in the signature space indicating a random access preamble and random access resources for indicating a selection for using the first SSB, wherein each group of signatures of the multiple groups of signatures is further associated with indicating a preference for using a preferred SSB that is different from the first SSB, such that selection of the signature indicates both of the selection for using the first SSB and the preference for using the preferred SSB for subsequent communications;

transmit, based on the signature, a random access message including the random access preamble to the base station over the random access resources associated with the first SSB;

receive, in response to the random access message, a second random access message from the base station, wherein the second random access message indicates quasi-colocation of the second random access message with one of the first SSB or the preferred SSB; and determine whether the second random access message indicates quasi-colocation of the second random access message with the first SSB or indicates quasi-colocation of the second random access message with the preferred SSB.

23. The apparatus of claim 22, wherein the one or more processors are configured to:
  determine whether the second random access message indicates quasi-colocation with the first SSB or second SSB based on determining whether the second random access message includes a first preamble index associated with the first SSB or a second preamble index associated with the preferred SSB; and
  receive, from the base station and in response to the random access message, the second random access message, wherein the second random access message is beamformed to indicate a quasi-colocation with the preferred SSB.

24. The apparatus of claim 22, wherein the one or more processors are further configured to:
  determine whether the second random access message indicates quasi-colocation with the first SSB or second SSB based on determining whether the second random access message includes a first random access radio network temporary identifier (RA-RNTI) associated with the first SSB or a second RA-RNTI associated with the first SSB and the preferred SSB; and
  receive, from the base station and in response to the random access message, the second random access message, wherein the second random access message is beamformed to indicate a quasi-colocation with the preferred SSB.

25. The apparatus of claim 22, wherein the second random access message is beamformed to indicate a quasi-colocation with the first SSB.

26. The apparatus of claim 22, wherein the one or more processors are configured to transmit, to the base station and in response to the second random access message and based on whether the second random access message indicates quasi-colocation with the first SSB or indicates quasi-colocation with the preferred SSB, a third random access message.

27. The apparatus of claim 26, wherein the one or more processors are further configured to receive, from the base station and in response to the third random access message, a fourth random access message, wherein the fourth random access message is beamformed to indicate a preferred quasi-colocation with the preferred SSB.

28. The apparatus of claim 22, wherein the one or more processors are further configured to determine to select the signature of the signature space of the first SSB and to indicate the preferred SSB based at least in part on at least one of determining that a reference signal power of the preferred SSB is within a threshold power of the first SSB, determining that the reference signal power of the preferred SSB is at least a threshold higher than the first SSB.

29. The apparatus of claim 22, wherein the one or more processors are configured to select the signature to indicate both of the selection for using the first SSB and the preference for using the preferred SSB for subsequent communications based at least in part on determining that SSB request groups are enabled in remaining minimum system information (RMSI) signaling from the base station.

30. The apparatus of claim 22, wherein the one or more processors are further configured to receive an indication of the signature space of the first SSB having groups of signatures, wherein each group corresponds to indicating one of the multiple SSBs as the preferred SSB, wherein the signature space is dynamically indicated in periodically received system information.

31. An apparatus for wireless communication, comprising:
  a transceiver;
  a memory configured to store instructions; and
  one or more processors communicatively coupled with the transceiver and the memory, wherein the one or more processors are configured to:
    transmit multiple synchronization signal blocks (SSBs), wherein the multiple SSBs are each beamformed based on a different directional beam;
    receive, from a device and based on a signature of a first SSB of the multiple SSBs, a random access message including a random access preamble associated with the first SSB over random access resources associated with the first SSB, wherein the random access message includes an indicator of a selection of the first SSB and a preferred SSB of the multiple SSBs that is different than the first SSB;
    determine, based on the random access message, the first SSB and the preferred SSB, wherein a signature space of the first SSB includes multiple groups of signatures, each signature in the signature space indicating a random access preamble and random access resources for indicating a selection for using the first SSB, wherein each group of signatures is further associated with indicating a preference for using a preferred SSB that is different from the first SSB, such that selection of the signature indicates both of the selection for using the first SSB and the preference for using the preferred SSB, and wherein determining the preferred SSB includes determining to which group of the multiple groups of signatures the signature belongs; and
    transmit, to the device and in response to the random access message, a second random access message, wherein the second random access message is beamformed to indicate a quasi-colocation of the second random access message with the first SSB.

32. The apparatus of claim 31, wherein transmitting the second random access message is based on one of a first preamble index associated with the first SSB or a second preamble index associated with the preferred SSB to indicate a quasi-colocation with the first SSB.

33. The apparatus of claim 31, wherein the one or more processors are configured to transmit, to the device, an indication of a signature space of the first SSB having groups of signatures, wherein each group corresponds to indicating one of the multiple SSBs as the preferred SSB, wherein the signature space is dynamically indicated in periodically transmitted system information.

\* \* \* \* \*